United States Patent
Inuduka et al.

(10) Patent No.: US 8,455,086 B2
(45) Date of Patent: Jun. 4, 2013

(54) TRANSPARENT LAMINATE FILM AND METHOD FOR PRODUCING SAME

(75) Inventors: Masataka Inuduka, Komaki (JP); Tetsuya Takeuchi, Komaki (JP); Hiroki Inagaki, Komaki (JP); Tetsuji Narasaki, Komaki (JP); Taiji Nishitani, Kasugai (JP)

(73) Assignee: Tokai Rubber Industries, Ltd., Aichi-Ken (JP)

( * ) Notice: Subject to any disclaimer, the term of this patent is extended or adjusted under 35 U.S.C. 154(b) by 0 days.

(21) Appl. No.: 13/308,967

(22) Filed: Dec. 1, 2011

(65) Prior Publication Data

US 2012/0076986 A1 Mar. 29, 2012

Related U.S. Application Data

(63) Continuation of application No. PCT/JP2010/064179, filed on Aug. 23, 2010.

(30) Foreign Application Priority Data

Aug. 26, 2009 (JP) ................................. 2009-195020
Sep. 16, 2009 (JP) ................................. 2009-214667

(51) Int. Cl.
*B32B 3/00* (2006.01)
*B32B 3/28* (2006.01)
*B32B 3/30* (2006.01)
*B32B 9/00* (2006.01)
*B32B 19/00* (2006.01)

(52) U.S. Cl.
USPC ........... 428/156; 428/167; 428/699; 428/701; 428/702; 428/172

(58) Field of Classification Search
USPC ................. 428/156, 167, 172, 469, 689, 699, 428/701, 702; 343/909; 156/268
See application file for complete search history.

(56) References Cited

U.S. PATENT DOCUMENTS

| 5,103,337 | A | 4/1992 | Schrenk et al. |
| 5,364,685 | A | 11/1994 | Nakashima et al. |
| 6,730,389 | B2 * | 5/2004 | Voeltzel .................... 428/195.1 |
| 2011/0262742 | A1 | 10/2011 | Takeuchi et al. |

FOREIGN PATENT DOCUMENTS

| JP | 4-313704 | 11/1992 |
| JP | 8-28592 | 2/1996 |
| JP | 2005-353656 | 12/2005 |
| JP | 2006-327177 | 12/2006 |
| JP | 2007-331296 | 12/2007 |
| JP | 2008-105251 | 5/2008 |
| WO | 2010/074050 | 7/2010 |

OTHER PUBLICATIONS

Search report from International Application No. PCT/JP2010/064179, mail date is Nov. 22, 2010.

* cited by examiner

*Primary Examiner* — Catherine A Simone
(74) *Attorney, Agent, or Firm* — Greenblum & Bernstein, P.L.C.

(57) ABSTRACT

A transparent laminate film which has visible light transmittance, sunlight blocking properties, radio wave transmittance and good appearance is provided. A transparent laminate film includes a laminate structure formed on at least one side of a transparent polymer film, in which a metal oxide layer and a metal layer are laminated, the metal oxide layer containing an organic component, wherein grooves having a width of 30 μm or less are formed in the laminate structure, and an overall surface resistance is 150 Ω/□ or more. Preferably, the grooves are numerous cracks, or are formed by laser processing. Further, preferably, the transparent polymer film has an easy adhesion layer formed on at least one side thereof, and the laminate structure is formed on top of the easy adhesion layer. Furthermore, preferably, the metal oxide layer containing the organic component is formed by a sol-gel method using optical energy during sol-gel curing.

9 Claims, 5 Drawing Sheets

US 8,455,086 B2

TRANSPARENT LAMINATE FILM AND METHOD FOR PRODUCING SAME

CLAIM FOR PRIORITY

This application is a continuation of PCT/JP2010/064179 filed Aug. 23, 2010, and claims the priority benefit of Japanese Applications No. 2009-195020, filed Aug. 26, 2009, and No. 2009-214667, filed Sep. 16, 2009, the contents of which is expressly incorporated by reference in its entirety.

TECHNICAL FIELD

The present invention relates to a transparent laminate film and a method for producing the same. More specifically, the present invention relates to a transparent laminate film that can be suitably used for heat ray cutting and a method for producing the same.

TECHNICAL BACKGROUND

Conventionally, as a solar radiation shielding film, a heat ray cut film is known. For example, in Patent Document 1, an optical interference film formed by simultaneously extruding a plurality of polymer layers having different refractive indices is described.

In recent years, a transparent laminate film of a multilayer film type is also proposed in which metal oxide layers and metal layers are alternately laminated on one side of a transparent polymer film. For example, in Patent Document 2, a transparent laminate film is disclosed in which seven layers of titanium oxide layers and silver layers are alternately laminated on one side of a PET film, the titanium oxide layers being formed by using a sol-gel method, and the silver layers being formed by using a sputtering method. In the Patent Document 2, it is described that the transparent laminate film is applicable to heat ray cutting.

Further, for example, in Patent Document 3, a technology is disclosed in which, in a heat ray reflecting glass formed by laminating a film having a high heat ray reflectance on a glass substrate, the film has a surface resistivity of 500Ω/□ or less, a dividing groove is formed on the film, and a solar radiation transmittance is 50% or less. In the Patent Document 3, it is described that, although a thermal insulation film allows radio waves to pass through at a groove width of about 50 µm, when the groove width is too small, because an electrical current jumps over a gap of the groove by a displacement current, a thermal insulation film becomes an electrically continuous body.

RELATED ART

Patent Documents

Patent Document 1: Japanese Patent Laid-Open Publication No. H 4-313704
Patent Document 2: Japanese Patent Laid-Open Publication No. 2005-353656
Patent Document 3: Japanese Examined Patent Application Publication No. H 8-28592

SUMMARY OF THE INVENTION

Problems to be Solved by the Invention

However, the above described conventional technologies have left room for improvement with respect to the following points.

For example, in order to reduce a rise in temperature in a building, a house, or an automobile, a heat ray cut film may be applied to a window glass. In this case, the heat ray cut film is required to have such functional capabilities as visible light transparency and solar radiation shielding capability. Further, in a building, a house, and the like, in order to use a mobile phone, a television, and the like, radio wave transparency at a high frequency of several hundred MHz or more is required. In recent years, ETC systems are in widespread use. When a heat ray cut film is applied to a window glass of an automobile, radio wave transparency is required so as to not hinder radio wave reception of an in-vehicle ETC equipment.

However, the film of the Patent Document 1 is composed of a plurality of polymer layers and does not include any metal layer. Therefore, there is a problem that, although the film has radio wave transparency, the film does not have sufficient solar radiation shielding capability. In addition, when this film is applied to a curved glass such as a windshield of an automobile, the polymer layers may be partially distorted, causing film thickness to change and color unevenness to occur, which may impair appearance.

Further, the film of the Patent Document 2 has a laminate structure in which metal oxide layers and metal layers are laminated. Therefore, although the film has visible light transparency and solar radiation shielding capability, because the metal layers are continuous, the film has poor radio wave transparency.

Further, in the technology of the Patent Document 3, the dividing groove formed on the film has a wide width of 50 µm or more. Therefore, although the film allows radio waves to efficiently pass through, the dividing groove is noticeable so that the film has a poor appearance.

The preset invention is devised in view of the above described problems. A problem to be solved by the present invention is to provide a transparent laminate film that has a combination of visible light transparency, solar radiation shielding capability, radio wave transparency, and a good appearance.

Means for Solving the Problems

To solve the above described problems, a transparent laminate film according to the present invention includes a laminate structure formed on at least one side of a transparent polymer film, in which a metal oxide layer and a metal layer are laminated, the metal oxide layer containing an organic component. Grooves having a width of 30 µm or less are formed in the laminate structure, and the transparent laminate film has an overall surface resistance of 150Ω/□ or more.

Here, it is desirable that the grooves be numerous cracks.

Or, it is desirable that the grooves be formed by laser processing.

In the transparent laminate film, it is desirable that the transparent polymer film have an easy adhesion layer formed on at least one side thereof, and the laminate structure be formed on top of the easy adhesion layer.

Further, in the above transparent laminate film, it is desirable that the metal oxide layer containing the organic component be formed by a sol-gel method using optical energy during sol-gel curing.

Further, it is desirable that a barrier layer composed mainly of metal oxide be formed on at least one side of the metal layer.

Further, it is desirable that the metal oxide layer be a titanium oxide layer.

Further, it is desirable that the metal layer be a silver layer or a silver alloy layer.

Further, it is desirable that the barrier layer be composed mainly of titanium oxide.

Further, it is desirable that the barrier layer be a layer formed by post-oxidizing a metal Ti layer or a layer formed by post-oxidizing a partially oxidized titanium oxide layer.

Further, it is desirable that the transparent laminate film have a visible light transmittance of 60% or more.

Further, it is desirable that the transparent laminate film be used for transmission of radio wave of a frequency of 100 MHz or more.

A method for producing a transparent laminate film according to the present invention includes a lamination process forming, on at least one side of a transparent polymer film, a laminate structure in which a metal oxide layer and a metal layer are laminated, the metal oxide layer containing an organic component; and a groove formation process forming grooves having a width of 30 μm or less in a formed laminate structure so that an overall surface resistance of the transparent laminate film is 150Ω/□ or more.

Here, it is desirable that formation of the grooves be performed by causing the organic component in the metal oxide layer containing the organic component to react, which causes cracks to form due to a stress that occurs in the laminate structure during the reaction.

Further, it is desirable that the organic component be a remaining component of a starting material of a sol-gel method, and the formation of the grooves include a step applying energy to the laminate structure from a surface thereof in an atmosphere containing one kind or two or more kinds of materials selected from oxygen, ozone, and water.

Further, it is desirable that the formation of the grooves be performed by subjecting the surface of the laminate structure to laser processing.

Further, it is desirable that the formation of the grooves be performed by stretching the transparent laminate film. In this case, it is desirable that the stretching be a biaxial stretching.

Another method for producing a transparent laminate film according to the present invention includes preparing a transparent polymer film having an easy adhesion layer formed on at least one side thereof; forming a laminate structure by laminating a metal oxide layer and a metal layer on top of the easy adhesion layer on at least one side, the metal oxide layer containing an organic component; and forming numerous cracks having a width of 30 μm or less in the laminate structure so that an overall surface resistance of the transparent laminate film is 1500Ω/□ or more.

Effect of the Invention

The transparent laminate film according to the present invention includes a laminate structure in which a metal oxide layer and a metal layer are laminated, the metal oxide layer containing an organic component. Therefore, the transparent laminate film has good visible light transparency and solar radiation shielding capability. Further, for the transparent laminate film according to the present invention, groves having a width of 30 μm or less are formed in the laminate structure, and the overall surface resistance is 150Ω/□ or more. That is, the metal layers in the laminate structures are broken by the grooves having a width of 30 μm or less so that the overall surface resistance of the transparent laminate film is 150Ω/□ or more. Therefore, in addition to a practical radio wave transparency, the transparent laminate film also has a good appearance as the grooves are hardly visible.

Therefore, the transparent laminate film according to the present invention, which has a combination of visible light transparency, solar radiation shielding capability, radio wave transparency, and a good appearance, is useful as a film for applying to a window glass of an architectural structure such as a building, a house, and the like, a window glass of a vehicle such as an automobile, and the like.

Here, in the case where the grooves are numerous cracks, directionality in the surface resistance is unlikely to appear so that the transparent laminate film has a superior uniformity in the surface resistance. Further, cracks can be introduced into the laminate structure in a relatively short time. Therefore, the transparent laminate film has a superior mass productivity.

Further, in the case where the grooves are formed by laser processing, the grooves can be formed in any form such as lattice-like, strip-like, slit-like, and the like.

In the transparent laminate film, in the case where the laminate structure is formed on top of an easy adhesion layer of the transparent polymer film, the continuity of the metal layer can be broken by cracks formed during the formation of the laminate structure.

In the transparent laminate film, in the case where the metal oxide layer containing the organic component is formed by a sol-gel method using optical energy during sol-gel curing, a starting material (such as a metal alkoxide and the like) of the sol-gel method is likely to remain in the metal oxide layer as an organic component. Therefore, by causing this organic component to react so as to cause cracks to form by a stress generated in the laminate structure during the reaction, grooves are easily formed.

Further, in the case where a barrier layer composed mainly of a metal oxide is formed on at least one side of the metal layer, diffusion of metal elements constituting each metal layer due to solar radiation can be inhibited. Therefore, the visible light transparency, solar radiation shielding capability, radio wave transparency, and good appearance are likely to be maintained for a long period of time, which can contribute to improved durability and reliability.

Further, in the case where the metal oxide layer is a titanium oxide layer, a relatively high refractive index is likely to be obtained. Therefore, visible light transparency is likely to be improved.

Further, the case where the metal layer is a silver layer or a silver alloy layer provides a good balance between visible light transparency, solar radiation shielding capability, and radio wave transparency, specified in the present invention.

Further, in the case where the barrier layer is composed mainly of a titanium oxide, diffusion of the elements constituting the metal layer such as silver and the like due to solar radiation and heat is likely to be inhibited.

Further, in the case where the barrier layer is a layer formed by post-oxidizing a metal Ti layer or a layer formed by post-oxidizing a partially oxidized titanium oxide layer, absorbed water and oxygen contained in the laminate structure are consumed during post-oxidation. Therefore, even when exposed to sunlight, shape change of the metal oxide layer containing the organic component is inhibited, peeling of the laminate structure is unlikely to occur, and durability against solar radiation is likely improved.

Further, in the case where the visible light transmittance is 60% or more, the transparent laminate film is useful as a film for applying to a window glass of an architectural structure such as a building and a house, a window glass of a vehicle such as an automobile, and the like.

The method for producing a transparent laminate film according to the present invention includes a lamination process forming, on at least one side of a transparent polymer film, a laminate structure in which a metal oxide layer and a metal layer are laminated, the metal oxide layer containing an organic component; and a groove formation process forming grooves having a width of 30 μm or less in a formed laminate structure so that an overall surface resistance of the transparent laminate film is 150Ω/□ or more. Therefore, a transparent laminate film of the above described configuration can be suitably produced.

Further, in the case where the formation of the grooves is performed by causing the organic component in the metal oxide layer containing the organic component to react to cause cracks to form due to a stress generated in the laminate structure during the reaction, numerous cracks can be formed in the laminate structure as grooves. Therefore, directionality in the surface resistance is unlikely to appear, and a transparent laminate film having superior uniformity in the surface resistance can be obtained. Further, cracks can be introduced in a relatively short time. Therefore, the transparent laminate film has a superior mass productivity.

Further, in the case where the organic component is a remaining component of a starting material of a sol-gel method and the formation of the grooves include a step applying energy to the laminate structure from the surface thereof in an atmosphere containing one kind or two or more kinds of materials selected from oxygen, ozone, and water, the one kind or two or more kinds of materials selected from oxygen, ozone, and water contained in the atmosphere cause the remaining component to undergo a sol-gel reaction, so that cracks are induced in the metal oxide layer by cure shrinkage, and, using these cracks as base points, the cracks can be propagated into the laminate structure. Therefore, hardly visible cracks can be relatively simply introduced into the laminate structure, and a predetermined surface resistance can be ensured.

Further, in the case where the formation of the grooves is performed by subjecting the surface of the laminate structure to laser processing, grooves can be formed in any form such as lattice-like, strip-like, slit-like, and the like.

Further, in the case where the formation of the grooves is performed by stretching the transparent laminate film, hardly visible cracks can be relatively simply introduced into the laminate structure, and a predetermined surface resistance can be ensured. In particular, when the stretching is a biaxial stretching, non-directional cracks are easily formed. Therefore, directionality in the surface resistance is unlikely to appear, and a transparent laminate film having superior uniformity in the surface resistance can be obtained.

The other method for producing a transparent laminate film according to the present invention includes preparing a transparent polymer film having an easy adhesion layer formed on at least one side thereof; forming a laminate structure by laminating a metal oxide layer and a metal layer on top of the easy adhesion layer on the at least one side, the metal oxide layer containing an organic component; and forming numerous cracks having a width of 30 µm or less in the laminate structure so that an overall surface resistance of the transparent laminate film is 150Ω/□ or more.

Therefore, simultaneously with the formation of the laminate structure, the continuity of the metal layer can be broken due to the cracks, and thus the groove formation process after the lamination process can be omitted. Therefore, the transparent laminate film has a superior mass productivity, which can contribute to cost reduction.

MODE FOR CARRYING OUT THE INVENTION

Figure 1:
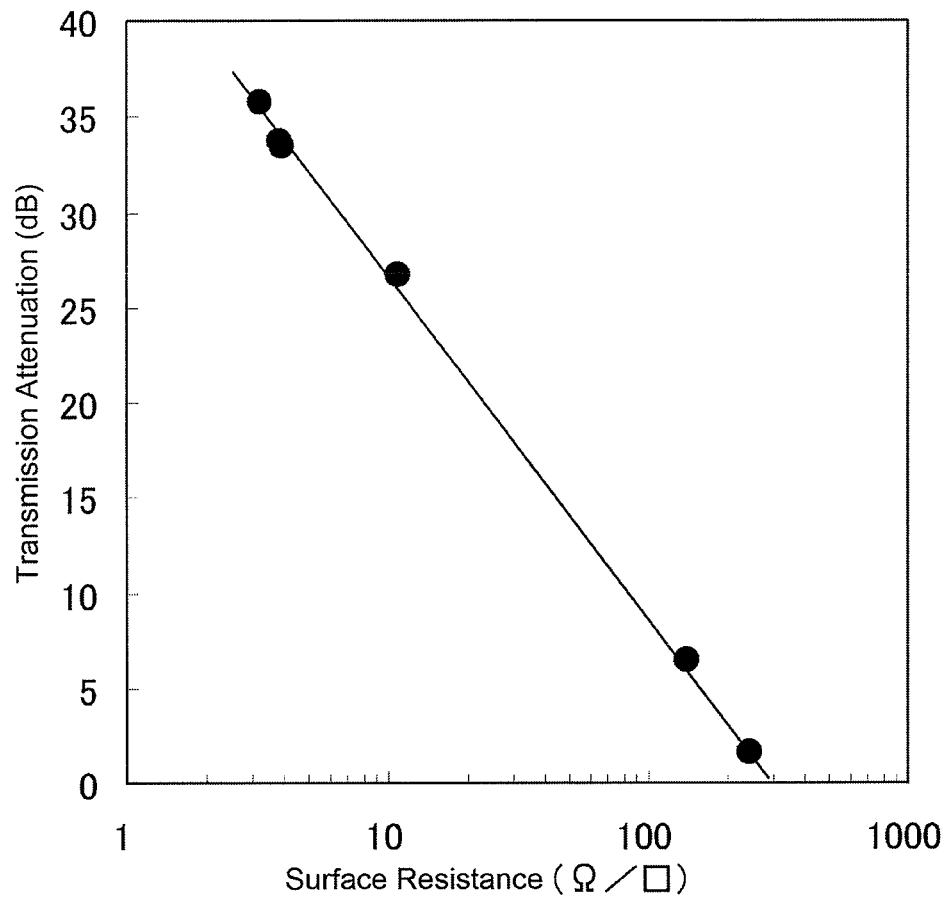
FIG. 1 is a diagram illustrating a relation between surface resistance (Ω/□) and transmission attenuation (dB)

A transparent laminate film (which may be referred to as "the present film" in the following) and a method for producing the same (which may be referred to as "the present production method" in the following) according to the present embodiment are explained in detail.

1. The Present Film

The present film includes a transparent polymer film and a laminate structure. The laminate structure may be formed on any one side of the transparent polymer film or on both sides of the transparent polymer film. From a point of view of cost and the like, it is desirable that the laminate structure be formed on one side of the transparent polymer film.

In the present film, the transparent polymer film acts as a base material for forming the laminate structure. As a material of the transparent polymer film, any material can be used that has transparency in a visible light region and a thin film can be formed without any difficulty on a surface thereof.

Examples of the material of the transparent polymer film include, specifically, for example, polymer materials such as polyethylene terephthalate, polycarbonate, polymethyl methacrylate, polyethylene, polypropylene, ethylene-vinyl acetate copolymer, polystyrene, polyimide, polyamide, polybutylene terephthalate, polyethylene naphthalate, polysulfone, polyether sulfone, polyether ether ketone, polyvinyl alcohol, polyvinyl chloride, polyvinylidene chloride, triacetyl cellulose, polyurethane, cyclo-olefin polymer, and the like. One kind or two or more kinds of these materials may be contained. Further, two or more kinds of transparent polymers can be laminated and used.

Among these material, from a point of view of having superior transparency, durability, workability, and the like, polyethylene terephthalate, polycarbonate, polymethyl methacrylate, cyclo-olefin polymer, and the like are examples of particularly preferred materials.

The transparent polymer film may have a surface treatment layer such as an easy adhesion layer and the like formed on one side or both sides of the transparent polymer film. The easy adhesive layer is mainly for a purpose of improving winding workability and handling workability of the transparent polymer film. In particular, such an easy adhesion layer is often formed on a transparent polymer film for optical applications for which silica particles or the like are mixed in the film or are attached to a surface of the film so that the above mentioned purpose is difficult to achieve.

Examples of a polymer material constituting the easy adhesion layer include, for example, acrylic resins, urethane resins, polyester resins, acrylic-urethane resins, and the like. In the easy adhesion layer, silica particles, polyethylene particles, and the like may be dispersed.

Thickness of the easy adhesion layer is not particularly limited. From a point of view of adhesiveness, transparency, cost, and the like, it is desirable that the thickness of the easy adhesion layer have an upper limit of preferably 20 μm or less, more preferably 10 μm or less, and even more preferably 5 μm or less. On the other hand, from a point of view of effect realization, it is desirable that the thickness of the easy adhesion layer have a lower limit of preferably 0.5 μm or more, more preferably 0.8 μm or more, and even more preferably 1.0 μm or more.

When the transparent polymer film has the easy adhesion layer, it is desirable that the laminate structure be formed on top of the easy adhesion layer. When the laminate structure is formed on top of the easy adhesion layer, a phenomenon is seen that cracks are easily formed in the layers constituting the laminate structure during the formation of the laminate structure. Therefore, the laminate structure formed on top of the easy adhesion layer has cracks formed during the formation of the laminate structure. These cracks are used as grooves, thereby, the continuity of a metal layer constituting the laminate structure can be broken (metal layer, grooves, and the like will be described in detail later).

Thickness of the transparent polymer film can be adjusted in various ways taking into account an intended purpose of the present film, the material of the present film, optical characteristics, durability, and the like. From a point of view of being hard for wrinkles to occur and hard to be broken during processing, it is desirable that the thickness of the transparent polymer film have a lower limit of preferably 25 μm or more, and more preferably 50 μm or more. On the other hand, from a point of view of being easy to be wound, economic efficiency, and the like, it is desirable that the thickness of the transparent polymer film have an upper limit of preferably 500 μm or less, and more preferably 250 μm or less.

In the present film, the laminate structure is formed by laminating a plurality of thin film layers and contains at least a metal oxide layer (which may be sometimes referred to as an "MO layer" in abbreviation in the following) and a metal layer (which may be sometimes referred to as an "M layer" in abbreviation in the following). Further, a barrier layer (which may be sometimes referred to as a "B layer" in abbreviation in the following) may be formed on any one side or both sides of the metal layer (M layer).

Examples of a basic structure of the laminate structure includes a laminate structure and the like in which the metal oxide layer (MO layer) and the metal layer (M layer) are alternately laminated.

Examples of a basic unit of the laminate structure include, specifically, for example, first basic units such as, from the transparent polymer film side, MO layer|B layer/M layer/B layer, MO layer|M layer/B layer, MO layer|B layer/M layer, or second basic units such as, from the transparent polymer film side, B layer/M layer/B layer|MO layer, M layer/B layer|MO layer, B layer/M layer|MO layer, and the like. Here, "|" means a layer separator; and "/" means that a B layer is attached to an M layer.

The laminate structure may be formed by laminating singly or repeatedly one basic unit or two or more basic units selected from the first basic units, and may also be formed by laminating singly or repeatedly one basic unit or two or more basic units selected from the second basic units.

Among these, from a point of view of being easy to inhibit diffusion of an element constituting the M layer into the MO layer, the unit of MO layer|B layer/M layer/B layer in the case of the first basic units and the unit of B layer/M layer/B layer|MO layer in the case of the second basic units can be preferably selected.

Among the thin film layers constituting the laminate structure, it is desirable that a thin film layer in contact with the transparent polymer film be a metal oxide layer (MO layer). This is because of advantages of being superior in optical characteristics such as high visible light transparency, low visible light reflection, and the like. Further, among the thin film layers constituting the laminate structure, it is desirable that a thin film layer arranged as an outermost layer be a metal oxide layer (MO layer). This is because of advantages such as being easy for grooves to form and the like, which will be described later (in particular for the case of cracks).

The number of laminating layers of the laminate structure can be varied taking into account optical characteristics such as visible light transparency, solar radiation shielding capability, and the like, overall surface resistance of the film, material and film thickness of each thin film layer, production cost, and the like. As the number of laminating layers, 2-10 layers and the like are preferable. Odd number of layers such as 3 layers, 5 layers, 7 layers, 9 layers, and the like are more preferable. From a point of view of production cost and the like, 3 layers, 5 layers and 7 layers are even more preferable.

More specifically, from a point of view of being easy to achieve a balance between transparency and solar radiation shielding capability, suppression of production cost, and the like, examples of preferred structures as the laminate structure include three-layer laminate structures such as MO layer (first layer)|B layer/M layer/B layer (second layer)|MO layer (third layer), MO layer (first layer)|B layer/M layer (second layer)|MO layer (third layer), MO layer (first layer)|M layer/B layer (second layer)|MO layer (third layer), MO layer (first layer)|M layer (second layer)|MO layer (third layer), and the like, five-layer laminate structures such as MO layer (first layer)|B layer/M layer/B layer (second layer)|MO layer (third layer)|B layer/M layer/B layer (fourth layer)|MO layer (fifth layer), MO layer (first layer)|B layer/M layer (second layer)|MO layer (third layer)|B layer/M layer (fourth layer) |MO layer (fifth layer), MO layer (first layer)|M layer/B layer (second layer)|(MO layer (third layer)|M layer/B layer (fourth layer)|MO layer (fifth layer), MO layer (first layer)|M layer (second layer)|MO layer (third layer)|M layer (fourth layer)|(MO layer (fifth layer), and the like, and seven-layer laminate structures such as MO layer (first layer)|B layer/M layer/B layer (second layer)|(MO layer (third layer)|B layer/M layer/B layer (fourth layer)|MO layer (fifth layer)|B layer/M layer/B layer (sixth layer)|MO layer (seventh layer), MO layer (first layer)|(B layer/M layer (second layer)|MO layer (third layer)|B layer/M layer (fourth layer)|MO layer (fifth layer)|B layer/M layer (sixth layer)|(MO layer (seventh layer), MO layer (first layer)|M layer/B layer (second layer) |MO layer (third layer)|M layer/B layer (fourth layer)|MO layer (fifth layer)|M layer/B layer (sixth layer)|MO layer (seventh layer), MO layer (first layer)|(M layer (second layer) |(MO layer (third layer)|M layer (fourth layer)|MO layer (fifth layer)|M layer (sixth layer)|MO layer (seventh layer), and the like, from the transparent polymer film side.

Further, the examples of preferred structures as the laminate structure include three-layer laminate structures such as B layer/M layer/B layer (first layer)|MO layer (second layer) |B layer/M layer/B layer (third layer), B layer/M layer (first layer)|MO layer (second layer)|B layer/M layer (third layer), M layer/B layer (first layer)|MO layer (second layer)|M layer/B layer (third layer), M layer (first layer)|MO layer (second layer)|M layer (third layer), and the like, five-layer laminate structures such as B layer/M layer/B layer (first layer)|MO layer (second layer)|B layer/M layer/B layer (third layer)|MO layer (fourth layer)|B layer/M layer/B layer (fifth layer), B layer/M layer (first layer)|MO layer (second layer) |B layer/M layer (third layer)|MO layer (fourth layer)|B layer/M layer (fifth layer), M layer/B layer (first layer)|MO layer (second layer)|M layer/B layer (third layer)|MO layer (fourth layer)|B layer/M layer (fifth layer), M layer (first layer)|MO layer (second layer)|M layer (third layer)|MO layer (fourth layer)|M layer (fifth layer), and the like, and seven-layer laminate structures such as B layer/M layer/B layer (first layer)|MO layer (second layer)|B layer/M layer/B layer (third layer)|MO layer (fourth layer)|B layer/M layer/B layer (fifth layer)|MO layer (sixth layer)|B layer/M layer/B layer (seventh layer), B layer/M layer (first layer)|MO layer (second layer)|B layer/M layer (third layer)|MO layer (fourth layer)|B layer/M layer (fifth layer)|MO layer (sixth layer)|B layer/M layer (seventh layer), M layer/B layer (first layer) |MO layer (second layer)|M layer/B layer (third layer)|MO layer (fourth layer)|M layer/B layer (fifth layer)|MO layer (sixth layer)|M layer/B layer (seventh layer), M layer (first layer)|MO layer (second layer)|M layer (third layer)|MO layer (fourth layer)|M layer (fifth layer)|MO layer (sixth layer)|M layer (seventh layer), and the like, from the transparent polymer film side.

A B layer is a thin film layer associated with an M layer. Therefore, for the number of laminating layers in the present application, an M layer including a B layer is counted as one layer, and an MO layer is counted as one layer.

In the present film, each thin film layer may be formed at once or may be formed in a divided manner. Further, some or all of the thin film layers contained in the laminate structure may be formed in a divided manner. In a case where each thin film layer is composed of a plurality of divisional layers, the number of divisions for each of the thin film layers may be the same or may be different. A divisional layer is not counted as one laminating layer. One thin film layer formed by a collection of a plurality of divisional layers is counted as one layer.

In the present film, composition and material of each thin film layer may be formed by the same composition or material, and may also be formed by different composition or material. This point also applies to the case where each thin film layer is formed from a plurality of divisional layers.

Film thickness of each thin film layer may be the same, and may also be different for each individual film.

The present film, roughly, has the laminate structure described above. Grooves are formed in this laminate structure. The grooves have primarily a role to break the continuity of the metal layer contained in the laminate structure, increase the surface resistance, and ensure radio wave transparency. The grooves have a width of 30 μm or less. The reason that the width of the grooves is limited to 30 μm or less is because that, when the width is above 30 μm, the grooves become easily visible and appearance deteriorates. From a point of view of appearance and the like, it is desirable that the width of the grooves be preferably 20 μm or less, and more preferably 10 μm or less. The width of the grooves is an average value of widths obtained by capturing five images of a surface of the laminate structure using an optical microscope and measuring with respect to grooves at three spots for each image (total fifteen spots).

There is no particular restriction with regard to a lower limit of the width of the grooves. However, from a point of view of surface resistance and the like, it is desirable that the lower limit of the width of the grooves be preferably 0.05 μm or more, and more preferably 0.1 μm or more.

With regard to a thickness-wise direction of the laminate structure, as far as the surface resistance is below a later described predetermined value, the grooves may have any depth. All of the grooves may have the same depth from the surface of the laminate structure, and each of the grooves may also have a different depth from the surface of the laminate structure.

Examples of shapes of the grooves include, for example, regular shapes such as a lattice-like shape, a slit-like shape, and the like, and irregular shapes such as cracks and the like. Shapes such as the lattice-like shape, the slit-like shape, and the like, for example, can be formed by subjecting the surface of the laminate structure to laser processing and the like. Whether a groove is formed by laser processing can often be confirmed by observing an edge of the groove. Cracks can be formed by causing a stress to be generated in a formed laminate structure. Or, cracks can also be formed during formation of a laminate structure. It is preferable that there are an infinite number of cracks. This is because directionality in the surface resistance, which will be described later, is unlikely to appear, which contributes to uniformity of the surface resistance.

The present film has an overall surface resistance of 150Ω/□ or more. There is a close relationship between the surface resistance of the film and the transmission attenuation of a radio wave. That is, in practice, in order to have radio wave transparency, it is desirable that ⅕ or more of radio wave energy be allowed to pass through. In order to allow ⅕ or more of the radio wave energy to pass through, the transmission attenuation needs to be 7 db or less. In order for the transmission attenuation to be 7 db or less, the overall surface resistance of the film needs to be 150Ω/□ or more. In the present application, in order to achieve this, grooves are formed in the laminate structure.

From a point of view of improving radio wave transparency, it is desirable that the surface resistance be preferably 170Ω/□ or more, more preferably 200Ω/□ or more, and even more preferably 300Ω/□ or more. There is no particular restriction with regard to an upper limit of the surface resistance. However, from a point of view of solar radiation shielding capability, transparency, appearance, and the like, it is desirable that the upper limit of the surface resistance be preferably 1000Ω/□ or less, and more preferably 800Ω/□ or less. The surface resistance can be measured using an eddy current meter and the like.

In the following, the metal oxide layers (MO layers) and metal layers (M layers) that constitute the laminate structure of the present film, and the barrier layers (B layers) that may be optionally included in the laminate structure of the present film, are explained in detail.

<Metal Oxide Layer>

In the present film, a metal oxide layer has transparency in the visible light region, and acts primarily as a high refractive index layer. Here, a high refractive index means a refractive index of 1.7 or more with respect to light of 633 nm.

Examples of the above metal oxide include, specifically, for example, titanium oxide, zinc oxide, indium oxide, tin oxide, oxide of indium and tin, magnesium oxide, aluminum oxide, zirconium oxide, niobium oxide, cerium oxide, and the like. One kind or two or more kinds of these materials may be contained. Further, these metal oxides may also be complex oxides that combine two or more kinds of metal oxides.

In particular, from a point of view of having a relatively large refractive index with respect to visible light and the like, examples of suitable materials as the above metal oxide include titanium oxide ($TiO_2$), ITO, zinc oxide (ZnO), tin oxide ($SnO_2$), and the like. One kind or two or more kinds of these materials may be contained.

Here, the metal oxide layer is mainly composed of the above described metal oxides. However, in addition to the metal oxides, an organic component may also be contained. This is because containing an organic component can further improve the flexibility of the present film. Examples of an organic component of this kind include, specifically, for example, components originating from a starting material of a sol-gel method, components originating from a material for forming the metal oxide layers, and the like.

Examples of the above organic component include, more specifically, for example, organic metallic compounds (including also decomposed materials thereof) such as metal alkoxides, metal acylates, metal chelates, and the like, of metals constituting the above described metal oxides, various kinds of additives such as organic compounds (described later) for forming ultraviolet absorbing chelates by reacting with the above organic metallic compounds, and the like. One kind or two or more kinds of these materials may be contained.

From a point of view of being easy to impart flexibility and the like, it is desirable that content of the organic component contained in the metal oxide layers have a lower limit of preferably 3% by mass or more, more preferably 5% by mass or more, and even more preferably 7% by mass or more. On the other hand, from a point of view of being likely to ensure a high refractive index, being likely to ensure solvent resistance, and the like, it is desirable that the content of the organic component contained in the metal oxide layers have an upper limit of preferably 30% by mass or less, more preferably 25% by mass or less, and even more preferably 20% by mass or less.

The content of the organic component can be examined using an X-ray photoelectron spectroscopy (XPS) or the like. The type of the organic component can be examined using an infrared spectroscopy (IR) (infrared absorption analysis) or the like.

The film thickness of the metal oxide layers can be adjusted by considering solar radiation shielding capability, visibility, reflected color, and the like.

From a point of view of being easy to inhibit red and yellow coloration of reflected color, being easy to obtain high transparency, and the like, it is desirable that the film thickness of the metal oxide layers have a lower limit of preferably 10 nm or more, more preferably 15 nm or more, and even more preferably 20 nm or more. On the other hand, from a point of view of being easy to inhibit green coloration of reflected color, being easy to obtain high transparency, and the like, it is desirable that the film thickness of the metal oxide layers have an upper limit of preferably 90 nm or less, more preferably 85 nm or less, and even more preferably 80 nm or less.

The metal oxide layers having the above described configuration, can be formed using any one of a gas phase method and a liquid phase method. The liquid phase method, as compared to the gas phase method, does not require vacuuming and using high power. Therefore, the liquid phase method is cost effective, and is also superior in productivity, and is thus preferable.

As the liquid phase method, from a point of view of being easy for an organic component to remain, and the like, a sol-gel method can be preferably used.

Examples of the sol-gel method include, more specifically, for example, a method and the like in which a coating liquid containing an organic metallic compound of a metal that constitutes a metal oxide is coated in a thin film shape, which is dried as needed to form a precursor layer of a metal oxide layer, and thereafter, the organic metallic compound contained in this precursor layer is caused to undergo a hydrolysis and condensation reaction to synthesize an oxide of the metal that constitutes the organic metallic compound. According to this, a metal oxide layer, containing a metal oxide as a main component and an organic component, can be formed. In the following, the above method is explained in detail.

The coating liquid can be prepared by dissolving the above organic metallic compound in a suitable solvent. In this case, examples of the organic metallic compound include, specifically, for example, organic metallic compounds of metals such as titanium, zinc, indium, tin, magnesium, aluminum, zirconium, niobium, cerium, silicon, hafnium, lead, and the like. One kind or two or more kinds of these materials may be contained.

Examples of the organic metallic compound include, specifically, for example, metal alkoxides, metal acylates, metal chelates, and the like, of the above metals. From a point of view of stability in the air, the metal chelates are preferable.

As the organic metallic compound, in particular, an organic compound of a metal that can lead to a metal oxide having a high refractive index can be preferably used. Examples of such an organic metallic compound include, for example, an organic titanium compound and the like.

Examples of the organic titanium compound include, specifically, for example, titanium alkoxides having a M-O—R bond (where R denotes an alkyl group and M denotes a titanium atom) such as tetra-n-butoxy titanium, tetraethoxy titanium, tetra-i-propoxy titanium, tetramethoxy titanium, and the like; titanium acylates having a M-O—CO—R bond (where R denotes an alkyl group and M denotes a titanium atom) such as isopropoxy titanium stearate, and the like; titanium chelates such as diisopropoxy titanium bis acetylacetonato, dihydroxy bis lactato titanium, diisopropoxy bis triethanol aminato titanium, diisopropoxy his ethyl acetoacetate titanium, and the like; and the like. One kind or two or more kinds of these compounds may be mixed. Further, these compounds may be monomers or polymers.

From a point of view of film thickness uniformity of a coated film, film thickness achievable by one coating, and the like, it is desirable that content of an organic metallic compound in the coating liquid be within a range of preferably 1-20% by mass, more preferably 3-15% by mass, and even more preferably 5-10% by mass.

Examples of a solvent dissolving the organic metallic compound include, specifically, for example, alcohols such as methanol, ethanol, propanol, butanol, heptanol, isopropyl alcohol, and the like; organic acid esters such as ethyl acetate, and the like; ketones such as acetonitrile, acetone, methyl ethyl ketone, and the like; cyclo ethers such as tetrahydrofuran, dioxane, and the like; acid amides such as formamide, N,N-dimethylformamide, and the like; hydrocarbons such as hexane and the like; aromatic series such as toluene and the like; and the like. One kind or two or more kinds of these compounds may be mixed.

In this case, from a point of view of film thickness uniformity of a coated film, film thickness achievable by one coating, and the like, it is desirable that an amount of the solvent be within a range of preferably 5-100 times, more preferably 7-30 times, and even more preferably 10-20 times of an amount of a solid component of the organic metallic compound.

When the amount of the solvent is more than 100 times, the film thickness achieved by one coating becomes thinner, and, in order to achieve a desired film thickness, there is a tendency that multiple times of coating become necessary. On the other hand, when the amount of the solvent is less than 5 times, there is a tendency that the film thickness becomes too thick and the hydrolysis and condensation reaction of the organic metallic compound becomes difficult to proceed sufficiently. Therefore, it is desirable that the amount of the solvent be selected taking these factors into consideration.

From a point of view of promoting hydrolysis using a sol-gel method, being likely to achieve a high refractive index, and the like, the coating liquid may contain water as needed.

The coating liquid can be prepared, for example, by a method such as stirring and mixing the organic metallic compound weighed so as to achieve a predetermined ratio, an appropriate amount of the solvent, and other ingredients added as needed, for a predetermined period of time using a stirring means such as a stirrer and the like. In this case, the mixing of the components may be done at one time or may be divided into multiple times.

From a point of view of facilitating a uniform coating, examples of a preferable coating method of the above coating liquid include various wet coating methods such as a micro gravure method, a gravure method, a reverse roll coating method, a dye coating method, a knife coating method, a dip coating method, a spin coating method, a bar coating method, and the like. These methods can be appropriately selected and used. One kind or two or more kinds of these methods may be used in combination.

When drying a coated coating liquid, a conventional drying equipment and the like may be used. In this case, examples of drying conditions include, specifically, for example, a temperature range of 80° C.-120° C., a drying time of 0.5 minute-5 minutes, and the like.

Examples of various means for causing the organic metallic compound in the precursor layer to undergo a hydrolysis and condensation reaction include, specifically, for example, irradiation of optical energy such as ultraviolet light, an electron beam, X-ray, and the like, heating, and the like. One kind or two or more kinds of these may be combined and used. Among these, the irradiation of optical energy, in particular, the ultraviolet irradiation, can be preferably used. This is because, as compared to other means, a metal oxide can be produced at a low temperature and in a short time, and it is less likely to add a thermal load such as thermal degradation and the like to the transparent polymer film (in particular, for the case of ultraviolet irradiation, there is an advantage that only a relatively simple equipment is required). Further, there is advantage that it is likely for the organic metallic compound (including decomposed materials thereof) to remain as the organic component.

In this case, examples of an ultraviolet irradiation equipment include, specifically, for example, a mercury lamp, an xenon lamp, a deuterium lamp, an excimer lamp, a metal halide lamp, and the like. One kind or two or more kinds of these may be combined and used.

Intensity of irradiating optical energy can be adjusted in various ways taking into consideration the type of the organic metallic compound from which the precursor layer is primarily formed, the thickness of the coating layer, and the like. When the intensity of the irradiating optical energy is too small, a high refractive index of the metal oxide layer is hard to achieve. On the other hand, when the intensity of the irradiating optical energy is too large, the transparent polymer film may deform due to heat generated during the optical energy irradiation. Therefore, it is preferred to pay attention to these factors.

In the case where the irradiating optical energy is ultraviolet light, from a point of view of the refractive index of the metal oxide layer, damage received by the transparent polymer film, and the like, when a measurement wavelength is within a range of 300-390 nm, it is desirable that the intensity of the ultraviolet light be within a range of preferably 300-8000 mJ/cm$^2$, and more preferably 500-5000 mJ/cm$^2$.

When the optical energy irradiation is used as a means for causing the organic metallic compound in the precursor layer to undergo a hydrolysis and condensation reaction, it is desirable that an additive such as an organic compound and the like that reacts with the organic metallic compound to form a light absorbing (for example, ultraviolet light absorbing) chelate be added to the above described coating liquid. When the additive is added to the coating liquid, which is a starting solution, a place where a light absorbing chelate was formed in advance is irradiated with optical energy. Therefore, a high refractive index of a metal oxide layer can be easily achieved at a relatively low temperature.

Examples of the above additive include, specifically, for example, such as β diketones, alkoxy alcohols, alkanolamines, and the like. More specifically, examples of the β diketones include, for example, acetylacetone, benzoylacetone, ethyl acetoacetate, methyl acetoacetate, diethyl malonate, and the like. Examples of the alkoxy alcohols include, for example, 2-methoxyethanol, 2-ethoxyethanol, 2-methoxy-2-propanol, and the like. Examples of the alkanolamines include, for example, monoethanolamine, diethanolamine, triethanolamine, and the like. One kind or two or more kinds of these compounds may be mixed.

Among these, the β diketones are particularly preferable. Among the β diketones, the acetylacetone can be most preferably used.

From a point of view of likely increasing the refractive index, stability of a state of a coated film, and the like, it is desirable that a mixing ratio of the above additive be within a range of preferably 0.1-2 moles, and more preferably 0.5-1.5 moles, with respect to 1 mole of metal atoms in the above organic metallic compound.

<Metal Layer>

In the present film, a metal layer primarily acts as a solar radiation shielding layer and the like.

Examples of the metal include, specifically, for example, metals such as silver, gold, platinum, copper, aluminum, chromium, titanium, zinc, tin, nickel, cobalt, niobium, tantalum, tungsten, zirconium, lead, palladium, indium, and the like; alloys of these metals; and the like. One kind or two or more kinds of these materials may be contained.

From a point of view of being superior in visible light transparency, heat ray reflectivity, electrical conductivity, and the like for a lamination, it is desirable that the above metal be silver or a silver alloy. From a point of view of improving durability with respect to an environment of heat, light, moisture, and the like, it is more desirable that the metal be a silver alloy containing silver as a primary component and at least one or more metallic elements such as copper, bismuth, gold, palladium, platinum, titanium, and the like. It is even more desirable that the metal be a copper-containing silver alloy (Ag—Cu based alloy), a bismuth-containing silver alloy (Ag—Bi based alloy), titanium-containing silver alloy (Ag—

Ti based alloy), or the like. This is because of advantages such as a large silver diffusion inhibition effect, being cost effective, and the like.

When a copper-containing silver alloy is used, in addition to silver and copper, other elements and unavoidable impurities may also be contained as far as they do not adversely affect, for example, silver aggregation and diffusion inhibition effects.

Examples of the above-mentioned other elements include, specifically, for example, elements solid-soluble in Ag such as Mg, Pd, Pt, Au, Zn, Al, Ga, In, Sn, Sb, Li, Cd, Hg, As, and the like; elements that can be precipitated as a single phase in an Ag—Cu based alloy such as Be, Ru, Rh, Os, Ir, Bi, Ge, V, Nb, Ta, Cr, Mo, W, Mn, Re, Fe, Co, Ni, Si, Tl, Pb, and the like; elements that can precipitate an intermetallic compound with Ag such as Y, La, Ce, Nd, Sm, Gd, Tb, Dy, Ti, Zr, Hf, Na, Ca, Sr, Ba, Sc, Pr, Eu, Ho, Er, Tm, Yb, Lu, S, Se, Te, and the like; and the like. One kind or two or more kinds of these elements may be contained.

When a copper-containing silver alloy is used, from a point of view of obtaining an additive effect, it is desirable that copper content have a lower limit of preferably 1% by atom or more, more preferably 2% by atom or more, and even more preferably 3% by atom or more. On the other hand, from a point of view of being easy to ensure high transparency, manufacturability such as easy preparation of a sputtering target, and the like, it is desirable that the content of copper have an upper limit of preferably 20% by atom or less, more preferably 10% by atom or less, and even more preferably 5% by atom or less.

When a bismuth-containing silver alloy is used, in addition to silver and bismuth, other elements and unavoidable impurities may also be contained as far as they do not adversely affect, for example, the silver aggregation and diffusion inhibition effects.

Examples of the above-mentioned other elements include, specifically, for example, elements solid-soluble in Ag such as Mg, Pd, Pt, Au, Zn, Al, Ga, In, Sn, Sb, Li, Cd, Hg, As, and the like; elements that can be precipitated as a single phase in an Ag—Bi based alloy such as Be, Ru, Rh, Os, Ir, Cu, Ge, V, Nb, Ta, Cr, Mo, W, Mn, Re, Fe, Co, Ni, Si, Tl, Pb, and the like; elements that can precipitate an intermetallic compound with Ag such as Y, La, Ce, Nd, Sm, Gd, Tb, Dy, Ti, Zr, Hf, Na, Ca, Sr, Ba, Sc, Pr, Eu, Ho, Er, Tm, Yb, Lu, S, Se, Te, and the like; and the like. One kind or two or more kinds of these elements may be contained.

When a bismuth-containing silver alloy is used, from a point of view of obtaining an additive effect, it is desirable that bismuth content have a lower limit of preferably 0.01% by atom or more, more preferably 0.05% by atom or more, and even more preferably 0.1% by atom or more. On the other hand, from a point of view of manufacturability such as easy preparation of a sputtering target, and the like, it is desirable that the content of bismuth have an upper limit of preferably 5% by atom or less, more preferably 2% by atom or less, and even more preferably 1% by atom or less.

When a titanium-containing silver alloy is used, in addition to silver and titanium, other elements and unavoidable impurities may also be contained as far as they do not adversely affect, for example, the silver aggregation and diffusion inhibition effects.

Examples of the above-mentioned other elements include, specifically, for example, elements solid-soluble in Ag such as Mg, Pd, Pt, Au, Zn, Al, Ga, In, Sn, Sb, Li, Cd, Hg, As, and the like; elements that can be precipitated as a single phase in an Ag—Ti based alloy such as Be, Ru, Rh, Os, Ir, Cu, Ge, V, Nb, Ta, Cr, Mo, W, Mn, Re, Fe, Co, Ni, Si, Tl, Pb, Bi and the like; elements that can precipitate an intermetallic compound with Ag such as Y, La, Ce, Nd, Sm, Gd, Tb, Dy, Zr, Hf, Na, Ca, Sr, Ba, Sc, Pr, Eu, Ho, Er, Tm, Yb, Lu, S, Se, Te, and the like; and the like. One kind or two or more kinds of these elements may be contained.

When a titanium-containing silver alloy is used, from a point of view of obtaining an additive effect, it is desirable that titanium content have a lower limit of preferably 0.01% by atom or more, more preferably 0.05% by atom or more, and even more preferably 0.1% by atom or more. On the other hand, from a point of view of being easy to obtain a complete solid solution when a film is formed, and the like, it is desirable that the content of titanium have an upper limit of preferably 2% by atom or less, more preferably 1.75% by atom or less, and even more preferably 1.5% by atom or less.

Ratio of a secondary element such as the above-mentioned copper, bismuth, titanium, and the like can be measured using ICP analysis. A metal (alloy) constituting the metal layer may be partially oxidized.

From a point of view of stability, heat ray reflectivity, and the like, it is desirable that the film thickness of the metal layer have a lower limit of preferably 3 nm or more, more preferably 5 nm or more, and even more preferably 7 nm or more. On the other hand, from a point of view of visible light transparency, economic efficiency, and the like, it is desirable that the film thickness of the metal layer have an upper limit of preferably 30 nm or less, more preferably 20 nm or less, and even more preferably 15 nm or less.

Here, examples of a method for forming the metal layer include gas phase methods, specifically, for example, physical vapor deposition methods (PVD) such as a vacuum deposition method, a sputtering method, an ion plating method, an MBE method, a laser ablation method, and the like; chemical vapor deposition methods (CVD) such as a thermal CVD method, a plasma CVD method, and the like; and the like. The metal layer may be formed by using any one of these methods, or may be formed by using two or more of these methods.

Among these methods, from a point of view of being able to obtain a dense film quality, being relatively easy to control film thickness, and the like, the sputtering method such as a DC magnetron sputtering method, an RF magnetron sputtering method, and the like can be preferably used.

The metal layer may be oxidized by subjecting the metal layer to post-oxidization and the like, which will be described later, as far as functional capabilities of the metal layer are not impaired.

<Barrier Layer>

In the present film, a barrier layer primarily acts as a barrier inhibiting diffusion of elements constituting the metal layer into the metal oxide layer. Further, by intervening between the metal oxide layer and the metal layer, the barrier layer also contributes to improvement of adhesion between the metal oxide layer and the metal layer.

As far as being able to inhibit the diffusion, the barrier layer may even have a discontinuous part such as a part in a shape of a floating island.

Examples of a metal oxide constituting the barrier layer include, specifically, for example, titanium oxide, zinc oxide, indium oxide, tin oxide, oxide of indium and tin, magnesium oxide, aluminum oxide, zirconium oxide, niobium oxide, cerium oxide, and the like. One kind or two or more kinds of these materials may be contained. Further, these metal oxides may also be complex oxides that combine two or more kinds of metal oxides. Besides the metal oxides, the barrier layer may also contain unavoidable impurities and the like.

Here, from a point of view of having a superior diffusion inhibition effect of a metal constituting the metal layer, superior adhesion, and the like, it is desirable that the barrier layer be composed primarily of an oxide of a metal contained in the metal oxide layer.

More specifically, for example, when a $TiO_2$ layer is selected as the metal oxide layer, it is desirable that the barrier layer be a titanium oxide layer composed primarily of an oxide of Ti, which is the metal contained in the $TiO_2$ layer.

Further, when the barrier layer is a titanium oxide layer, the barrier layer may be a thin film layer formed as a titanium oxide from the very beginning. The barrier layer may also be a thin film layer formed by post-oxidizing a metal Ti layer, or a thin film layer formed by post-oxidizing a partially oxidized titanium oxide layer.

The barrier layer is composed mainly of a metal oxide, same as the metal oxide layer. However, the barrier layer is configured to have a thinner film thickness than the metal oxide layer. This is because diffusion of the metal constituting the metal layer occurs at an atomic level so that the necessity is low to thicken to a film thickness required to ensure a sufficient refractive index. Further, forming a thin layer reduces film formation cost, and thus can contribute to reduction of the production cost of the present film.

From a point of view of being likely to ensure barrier capability and the like, it is desirable that the film thickness of the barrier layer have a lower limit of preferably 1 nm or more, more preferably 1.5 nm or more, and even more preferably 2 nm or more. On the other hand, from a point of view of economic efficiency and the like, it is desirable that the film thickness of the barrier layer have an upper limit of preferably 15 nm or less, more preferably 10 nm or less, and even more preferably 8 nm or less.

When the barrier layer is composed mainly of a titanium oxide, from a point of view of the barrier capability and the like, it is desirable that an atomic mole ratio, Ti/O, of titanium with respect to oxygen in the titanium oxide have a lower limit of preferably 1.0/4.0 or more, more preferably 1.0/3.8 or more, even more preferably 1.0/3.5 or more, even most preferably 1./0/3.0 or more, and most preferably 1.0/2.8 or more.

When the barrier layer is composed mainly of a titanium oxide, from a point of view of the visible light transparency and the like, it is desirable that the atomic mole ratio, Ti/O, of titanium with respect to oxygen in the titanium oxide have an upper limit of preferably 1.0/0.5 or less, more preferably 1.0/0.7 or less, even more preferably 1.0/1.0 or less, even more preferably 1.0/1.2 or less, and most preferably 1./0/1.5 or less.

The Ti/O ratio can be calculated from the composition of the layer. As a composition analysis method of the layer, from a point of view of allowing composition of an extremely thin thin film layer to be relatively accurately analyzed, energy dispersive fluorescent X-ray analysis (EDX) can be preferably used.

To explain about a specific composition analysis method, first, by using an ultra thin sectioning method (microtome) and the like, a test specimen is prepared having a thickness of 100 nm or less in a cross sectional direction of the laminate structure containing the layer to be analyzed. Next, the laminated structure and location of the layer from the cross sectional direction are confirmed using a transmission electron microscope (TEM). Next, an electron beam is emitted from an electron gun of an EDX equipment and is made incident to a vicinity of a thickness-wise central region of the layer to be analyzed. Electrons made incident from a surface of the test specimen penetrate to a certain depth and generate various electron beams and X-rays. In this case, by detecting and analyzing characteristic X-rays, constituent elements of the layer can be analyzed.

In the present film, for the barrier layer, from a point of view of allowing formation of a dense film, allowing formation of a thin film layer having a uniform film thickness of about from several nanometers to several tens of nanometers, and the like, a gas phase method can be preferably used.

Examples of the gas phase method include, specifically, for example, physical vapor deposition methods (PVD) such as a vacuum deposition method, a sputtering method, an ion plating method, an MBE method, a laser ablation method, and the like; chemical vapor deposition methods (CVD) such as a thermal CVD method, a plasma CVD method, and the like; and the like. As the gas phase method, the sputtering method such as a DC magnetron sputtering method, an RF magnetron sputtering method, and the like can be preferably used, from a point of view that adhesion at a film interface is superior, film thickness control is easy, and the like, as compared to a vacuum deposition method and the like.

Each barrier layer contained in the laminate structure may be formed by using any one of these gas phase methods, or, may also be formed by using two or more of these gas phase methods.

The barrier layer may be formed using the above described gas phase methods as a metal oxide layer from the very beginning. Or, the barrier layer can also be formed by first forming a metal layer or a partially oxidized metal oxide layer and then post-oxidizing the metal layer or the partially oxidized metal oxide layer. A partially oxidized metal oxide layer is a metal oxide layer having room for further oxidation.

In the case where the barrier layer is formed as a metal oxide layer from the very beginning, specifically, for example, the thin film may be formed by further mixing a gas containing oxygen as a reactive gas with an inert gas such as argon and neon as a sputtering gas and allowing metal and oxygen to react (reactive sputtering method). In the case where, for example, a titanium oxide layer having the above-mentioned Ti/O ratio is obtained using the reactive sputtering method, an optimal oxygen concentration in the atmosphere (volume ratio of the oxygen-containing gas to the inert gas) may be appropriately selected by considering the above described film thickness range.

On the other hand, in the case where a metal layer or a partially oxidized metal oxide layer is formed and later post-oxidized, specifically, the above described laminate structure may be formed on the transparent polymer film and thereafter the metal layer or partially oxidized metal oxide layer in the laminate structure may be post-oxidized. For the formation of the metal layer, a sputtering method and the like may be used; for the formation of the partially oxidized metal oxide layer, the above described reactive sputtering method and the like may be used.

Examples of a post-oxidation method include heat treatment, pressure treatment, chemical treatment, natural oxidation, and the like. Among these post-oxidation methods, from a point of view of being relatively simple and allowing post-oxidation to be reliably performed and the like, the heat treatment is preferable. Examples of the heat treatment include, for example, a method in which the transparent polymer film having the above described laminate structure is placed in a heating atmosphere such as a heating furnace and the like, a warm water immersion method, a microwave heating method, a method in which a metal layer, a partially oxidized metal oxide layer, and the like in the laminate structure are electrical-current heated, and the like. One method or a combination of two or more of these methods may be performed.

It is desirable that heating conditions during the heat treatment be selected from, specifically, for example, a heating temperature within a range of preferably 30° C.-60° C., more preferably 32° C.-57° C., and even more preferably 35° C.-55° C., and a heating time of preferably 5 days or more, more preferably 10 days or more, and even more preferably 15 days or more, when placed in a heating atmosphere. This is because of good post-oxidation effect, thermal deformation and fusion bonding inhibition effects of the transparent polymer film, and the like, when the heating conditions are within the above ranges.

It is desirable that the heating atmosphere during the heat treatment be an atmosphere containing oxygen and moisture such as the air, a high oxygen atmosphere, a high humidity atmosphere, and the like. From a point of view of manufacturability, cost reduction, and the like, the air is particularly preferable.

In a case where the above described post-oxidized thin film is contained in the laminate structure, during post-oxidation, moisture and oxygen contained in the metal oxide layer are consumed. Therefore, even when exposed to sunlight, the metal oxide layer is unlikely to undergo a chemical reaction. Specifically, for example, when a metal oxide layer is formed using a sol-gel method, during post-oxidation, moisture and oxygen contained in the metal oxide layer are consumed. Therefore, it is unlikely for a sol-gel curing reaction, caused by sunlight, to occur between a starting material (metal alkoxide and the like) of the sol-gel method remained in the metal oxide layer and moisture (absorbed water and the like), oxygen, and the like. Therefore, an internal stress caused by a volume change due to cure shrinkage and the like can be relaxed, interfacial debonding in the laminate structure is likely inhibited, and durability against sunlight is likely improved.

It is desirable that the above described present film have a visible light transmittance of 60% or more. This is because the present film is useful as a film for applying to a window glass of an architectural structure such as a building and a house, a window glass of a vehicle such as an automobile, and the like. It is desirable that the visible light transmittance be preferably 65% or more and more preferably 70% or more.

The present film can be suitably used for transmission of radio wave having a frequency of 100 MHz or more. Examples of specific radio waves include radio wave of an ETC system (5.8 GHz), radio wave of a mobile phone (800 MHz-2.2 GHz), and the like.

2. Present Production Method

The present production method is a method capable of suitably producing the present film described above.

2.1 First Production Method

A first production method includes a lamination process and a groove formation process.

The lamination process is a process forming the laminate structure in which a metal oxide layer, which contains an organic component, and a metal layer are laminated on at least one side of a transparent polymer film. The lamination process varies depending on the configuration of the laminate structure. However, basically, each layer can be formed using an optimal method for the layer, and the laminate structure can be formed by sequentially laminating each layer. In the case where a barrier layer is formed using a post-oxidation method, each layer is sequentially laminated in a way including the layer before post-oxidation, and thereafter, convert the layer into a barrier layer by post-oxidation.

In the lamination process, a transparent polymer film having an easy adhesion layer formed on one side or both sides thereof can be suitably used. In this case, it is desirable that the laminate structure be formed on top of the easy adhesion layer. This is because that, during the formation of the laminate structure, cracks can be formed, and thus, the surface resistance of the film is easily ensured.

The groove formation process is a process forming grooves having a width of 30 µm or less in the laminate structure fondled by the lamination process so that the overall surface resistance is 150Ω/□ or more.

Examples of a groove formation method includes, for example, (1) a method of applying a stress to generate cracks in the laminate structure formed by the lamination process; (2) a method of subjecting a surface of the laminate structure to laser processing; (3) a method of stretching the film having the laminate structure formed therein to generate cracks; and the like.

In the case of (1), for example, when the metal oxide layer in the laminate structure contains as an organic component a remaining component and the like of a starting material and the like of a sol-gel method, the organic component is caused to undergo a reaction, and a stress is generated in the laminate structure by the reaction process, which causes cracks to form. Such a method and the like can be used.

More specifically, for example, in an atmosphere containing oxygen ($O_2$), ozone ($O_3$), moisture, and the like, by supplying energy such as ultraviolet light, electron beam, heat, and the like from the surface of the laminate structure, the organic component is caused to undergo a reaction, and a stress is generated in the laminate structure by the reaction process, which can cause cracks to form.

The above groove formation process may be performed once or two or more times. That is, the groove formation process may be performed for a plurality of times so that the overall surface resistance of the film is 150Ω/□ or more. Further, from a point of view of promoting the above-mentioned reaction, the cracks may be formed under heating.

In the above method (1), when grooves are formed by cracks, it is desirable that the outermost surface of the laminate structure be a metal oxide layer containing as an organic component a remaining component of a starting material of sol-gel method. This is because a sol-gel reaction of a remaining component contained in the outermost surface proceeds easily, cracks are induced in the metal oxide layer by cure shrinkage, and, using these cracks as base points, the cracks are easily propagated into the laminate structure.

Processing conditions for the laser processing of the above method (2) is not particularly limited as far as grooves of 30 µm or less can be formed. Examples of the laser wavelength used include, for example, a range of 0.1-10 µm, and the like.

The film stretching in the above method (3) may any one of a uniaxial stretching and a biaxial stretching. When the groove formation is performed by film stretching, hardly visible cracks can be relatively simply introduced into the laminate structure, and a predetermined surface resistance can be ensured. In particular, when the stretching is a biaxial stretching, non-directional cracks are easily formed. Therefore, directionality in the surface resistance is unlikely to appear, and a transparent laminate film having superior uniformity in the surface resistance can be obtained.

From a point of view of ensuring the surface resistance, it is desirable that a tensile ratio during stretching have a lower limit of preferably 0.5% or more, more preferably 1% or more, and even more preferably 2% or more. On the other hand, from a point of view of flatness of the film, heat resistance, ensuring optical characteristics, and the like, it is desirable that the tensile ratio during stretching have an upper limit of preferably 50% or less, more preferably 40% or less, and even more preferably 30% or less.

When performing the above described post-oxidation, the post-oxidation may be performed before the grooves are formed or after the groove are formed.

2.2 Second Production Method

A second production method includes a lamination process. However, the second production method is significantly different from the first production method in that the second production method does not include a groove formation process.

That is, the lamination process of the second production method is a process in which a transparent polymer film having an easy adhesion layer on at least one side thereof is prepared, and, on top of the easy adhesion layer on the at least one side, a metal oxide layer, which contains an organic component, and a metal layer, are laminated to form a laminate structure.

When the laminate structure is formed on top of the easy adhesion layer, a phenomenon is seen that cracks are easily formed in the layers constituting the laminate structure during the formation of the laminate structure. A detailed mechanism is unknown. However, it is presumed that it is because crack formation is promoted by a stress caused by shrinkage of the easy adhesion layer due to the formation of the laminate structure, stress concentration on protruding portions due to dispersed particles such as silica particles, which are often contained in the easy adhesion layer, surface roughness of the easy adhesion layer, and the like. Regardless of the underlying mechanism, the cracks formed during the formation of the laminate structure can be used as grooves, thereby, the continuity of the metal layer constituting the laminate structure can be broken in the lamination process. Therefore, a groove formation process can be omitted.

In the lamination process, it is desirable that the prepared transparent polymer film have the easy adhesion layer formed on both sides thereof. This is because of advantages such as that, when an easy adhesion layer also exists on a side of the film opposite to the side on which the laminate structure is formed, winding and feeding of the film become easy.

Embodiments

In the following, the present invention is explained in detail using embodiments and comparative examples.

1. Preliminary Experiment

Four types of transparent laminate films and two types of ITO films, having different surface resistances, were prepared. The surfaces resistances of these six types of films were measured using an eddy current meter (manufactured by DELCOM). Transmission attenuation (shielding capability) at a frequency of 1 GHz was measured using an electromagnetic wave shielding and electromagnetic shielding properties testing equipment ("MA8602B" manufactured by Anritsu Corporation) and a spectrum analyzer ("MS2661C" manufactured by Anritsu Corporation), according to a method of the Kansai Electronic Industry Development Center (KEC). FIG. 1 illustrates a relation between the surface resistance ($\Omega/\square$) and the transmission attenuation (dB).

According to FIG. 1, in order to achieve a transmission attenuation of 7 dB or less, required to allow ⅕ or more of radio wave energy to pass through, an overall surface resistance of 150 ($\Omega/\square$) or more of the film is required. It is clear that, when the surface resistance is less than 150 ($\Omega/\square$), the transmission attenuation increases so that a degree of radio wave transparency necessary for practical use cannot be obtained.

2. Experiment 1

2.1 Preparation of Transparent Laminate Film (without Grooves)

Transparent laminate films (without grooves) having a three-layer laminate structure and a seven-layer laminate structure, as outlined in the following, were prepared.

That is, the transparent laminate film having a three-layer laminate structure (without grooves) has a laminate structure in which the following layers are laminated in sequence on a surface (PET surface) on a side opposite to an easy adhesion layer side of a PET film: a $TiO_2$ layer formed by a sol-gel method and ultraviolet irradiation (first layer)|a layer formed by post-oxidizing a metal Ti layer/an Ag—Cu alloy layer/a metal Ti layer (second layer)|a $TiO_2$ layer formed by a sol-gel method and ultraviolet irradiation (third layer).

On the other hand, the transparent laminate film having a seven-layer laminate structure (without grooves) has a laminate structure in which the following layers are laminated in sequence on a surface (PET surface) on a side opposite to an easy adhesion layer side of a PET film: a $TiO_2$ layer formed by a sol-gel method and ultraviolet irradiation (first layer)|a layer formed by post-oxidizing a metal Ti layer/an Ag—Cu alloy layer/a metal Ti layer (second layer)|a $TiO_2$ layer formed by a sol-gel method and ultraviolet irradiation (third layer)|a layer formed by post-oxidizing a metal Ti layer/an Ag—Cu alloy layer/a metal Ti layer (fourth layer)|a $TiO_2$ layer formed by a sol-gel method and ultraviolet irradiation (fifth layer)|a layer formed by post-oxidizing a metal Ti layer/an Ag—Cu alloy layer/a metal Ti layer (sixth layer)|a $TiO_2$ layer formed by a sol-gel method and ultraviolet irradiation (seventh layer).

In the above, the post-oxidized metal Ti layers correspond to barrier layers. The barrier layers, as thin films attached to the alloy layers, are included in the alloy layers for laminating layer number counting. The post-oxidation, specifically, is thermal oxidation.

In the following, specific preparation steps of the transparent laminate film (without grooves) are explained.

(Preparation of Coating Liquid)

First, a coating liquid used in forming a $TiO_2$ thin film by a sol-gel method was prepared. That is, the coating liquid was prepared by combining a tetra-n-butoxy titanium tetramer ("B4", manufactured by Nippon Soda Co., Ltd.) as a titanium alkoxide and acetylacetone as an additive forming a ultraviolet light absorbing chelate with a mixed solution of n-butanol and isopropyl alcohol, and mixing the combination for 10 minutes using a stirrer. In this case, combination percentages of tetra-n-butoxy titanium tetramer/acetylacetone/n-butanol/isopropyl alcohol were respectively 6.75% by mass/3.38% by mass/59.87% by mass/30.00% by mass.

(Lamination of Each Layer)

As the transparent polymer film, a polyethylene terephthalate film having a thickness of 50 µm and having an easy adhesion layer formed on one side thereof ("COSMOSHINE (registered trademark) A4100" manufactured by Toyobo Co., Ltd.) (referred to as "PET film" in the following) was used. On a side (the PET side) opposite to the easy adhesion layer side of the PET film, a $TiO_2$ layer as a first layer was formed by the following steps.

That is, the coating liquid was continuously coated on the PET side of the PET film using a micro gravure coater with gravure rolls each having a predetermined groove volume.

Next, using an inline drying furnace, the coated film was dried for 80 seconds at a temperature of 100° C., and a precursor layer of a $TiO_2$ layer was formed. Next, using an inline ultraviolet light irradiation equipment [a high pressure mercury lamp (160 W/cm)], the precursor layer was continuously irradiated with ultraviolet light for 1.5 seconds at a same line speed as during coating. By doing this, a $TiO_2$ layer (first layer) by a sol-gel method using ultraviolet light energy during sol-gel curing (which may be sometimes referred to as "sol-gel+UV" in abbreviation in the following) was formed on the PET film.

Next, on top of the first layer, thin films constituting the second layer were formed.

That is, a lower side metal Ti layer was formed on top of the $TiO_2$ layer of the first layer by sputtering using a DC magnetron sputter equipment. Next, an Ag—Cu alloy layer was formed on top of the lower side metal Ti layer by sputtering. Next, an upper side metal Ti layer was formed on top of the Ag—Cu alloy layer by sputtering.

In this case, film formation conditions for the upper and lower side metal Ti layers were as follows: Ti target (purity 4N); ultimate vacuum pressure: $5 \times 10^{-6}$ (Torr); inert gas: Ar; gas pressure: $2.5 \times 10^{-3}$ (Torr); input power: 1.5 (kW); and film formation time: 1.1 seconds.

Film formation conditions for the Ag—Cu alloy thin film were as follows: Ag—Cu alloy target (Cu content: 4% by atom); ultimate vacuum pressure: $5 \times 10^{-6}$ (Torr); inert gas: Ar; gas pressure: $2.5 \times 10^{-3}$ (Torr); input power: 1.5 (kW); and film formation time: 1.1 seconds.

Next, as the third layer, the $TiO_2$ layer by "sol-gel+UV" was formed on top of the second layer. Here, a predetermined film thickness was obtained by performing twice the film formation steps according to the first layer.

Thereafter, the transparent laminate film obtained via the above lamination process was subjected to a heat treatment in a heating furnace for 300 hours at a temperature of 40° C. to post-oxidize the metal Ti layer/Ag—Cu alloy layer/metal Ti layer (the second layer) contained in the laminate structure.

Thus, the transparent laminate film having the three-layer laminate structure (without grooves) was prepared. The transparent laminate film having the seven-layer laminate structure (without grooves) was prepared by performing the following steps, continued from the step after the third layer was laminated (without the post-oxidation step after the formation of the third layer) in the preparation of the transparent laminate film having the three-layer laminate structure (without grooves). That is, as the fourth layer, on top of the third layer, thin films constituting the fourth layer were formed. Here, film formation steps according to the second layer were performed.

However, the above described film formation conditions during the formation of the Ag—Cu alloy thin film were modified as follows: Ag—Cu alloy target (Cu content: 4% by atom); ultimate vacuum pressure: $5 \times 10^{-6}$ (Torr); inert gas: Ar; gas pressure: $2.5 \times 10^{-3}$ (Torr); input power: 1.8 (kW); and film formation time: 1.1 seconds, and thereby, the film thickness was changed.

Next, as the fifth layer, on top of the fourth layer, a $TiO_2$ layer by "sol-gel+UV" having the same configuration as the third layer was formed.

Next, as the sixth layer, on top of the fifth layer, thin films having the same configuration as those of the second layer were formed.

Next, as the seventh layer, on top of the sixth layer, a $TiO_2$ layer by "sol-gel+UV" was formed. Here, a predetermined film thickness was obtained by performing once the film formation steps according to the first layer.

Thereafter, the transparent laminate film obtained via the above lamination process was subjected to a heat treatment in a heating furnace for 300 hours at a temperature of 40° C. to post-oxidize the metal Ti layer/Ag—Cu alloy layer/metal Ti layer (the second, fourth, and sixth layers) contained in the laminate structure.

Thus, the transparent laminate film having the seven-layer laminate structure (without grooves) was prepared.

Refractive indices of the $TiO_2$ layers (for a measurement wavelength of 633 nm) were measured using a FilmTek 3000 (manufactured by Scientific Computing International).

Contents of the organic components contained in the $TiO_2$ layers were measured using an X-ray photoelectron spectroscopy (XPS).

With respect to the titanium oxide thin films formed by post-oxidizing the metal Ti layers, EDX analysis was performed, and Ti/O ratios were obtained as follows.

That is, a test specimen having a thickness of 100 nm or less in a cross sectional direction of the laminated structure containing the titanium oxide layer (barrier layer) to be analyzed was prepared by cutting the transparent laminate film using a microtome ("ultrome V2088" manufactured by LKB). A cross section of the prepared test specimen was confirmed using a field emission electron microscopy (HRTEM) ("JEM2001F" manufactured by JEOL Ltd.). Next, by using an EDX equipment (which has a spectral resolution of 133 eV or less) ("JED-2300T" manufactured by JEOL Ltd.), an electron beam was emitted from an electron gun of the EDX equipment and was made incident to a vicinity of a thickness-wise central region of the titanium oxide layer (barrier layer) to be analyzed. Analysis of constituent elements of the titanium oxide layer (barrier layer) was performed by detecting and analyzing generated characteristic X-rays.

Content of the secondary element Cu contained in the alloy layers was obtained as follows. That is, under the film formation conditions, a test specimen was separately prepared by forming an Ag—Cu alloy layer on a glass substrate. The test specimen was immersed in a solution containing 6% of $HNO_3$. After performing elution by ultrasound for 20 minutes, the obtained sample solution was used to perform a measurement using a concentration method of an ICP analysis method.

Thickness of each of the layers was measured by cross-sectional observation of the test specimen using the field emission electron microscopy (HRTEM) ("JEM2001F" manufactured by JEOL Ltd.).

Table 1 illustrates detailed lamination configuration of the transparent laminate films having the three-layer laminate structures (without grooves), and Table 2 illustrates detailed lamination configuration of the transparent laminate films having the seven-layer laminate structures (without grooves).

TABLE 1

|  |  |  |  | Embodiments 1, 3, 5, 6 | Comparative examples 1, 3, 5 |
|---|---|---|---|---|---|
| Thin film layer configuration (before groove formation) | first layer | Metal oxide layer (sol-gel + UV) | — | TiO$_2$ | TiO$_2$ |
|  |  | Film thickness | (nm) | 22 | 22 |
|  |  | Refractive index | — | 1.85 | 1.85 |
|  |  | Organic component content | (%) | 15 | 15 |
|  | second layer | Barrier layer | Post-oxidation | Titanium oxide | Titanium oxide |
|  |  | Film thickness | (nm) | 2 | 2 |
|  |  | Ti/O ratio | — | 1.0/1.8-1.0/1.6 | 1.0/1.8-1.0/1.6 |
|  |  | Metal layer | — | Ag—Cu | Ag—Cu |
|  |  | Film thickness | (nm) | 9 | 9 |
|  |  | Secondary element content | (% by atom) | Cu: 4 | Cu: 4 |
|  |  | Barrier layer | Post-oxidation | Titanium oxide | Titanium oxide |
|  |  | Film thickness | (nm) | 2 | 2 |
|  |  | Ti/O ratio | — | 1.0/1.8-1.0/1.6 | 1.0/1.8-1.0/1.6 |
|  | third layer | Metal oxide layer (sol-gel + UV) | — | TiO$_2$ | TiO$_2$ |
|  |  | Film thickness | (nm) | 34 | 34 |
|  |  | Refractive index | — | 1.85 | 1.85 |
|  |  | Organic component content | (%) | 15 | 15 |

(*) Order of a laminating layer is counted from the film side.
(*) A barrier layer, as a thin film layer attached to a metal layer, is included in the metal layer for laminating layer number counting.
(*) Film thickness is physical film thickness.

TABLE 2

|  |  |  |  | Embodiments 2, 4, 7, 8 | Comparative examples 2, 4, 6 |
|---|---|---|---|---|---|
| Thin film layer configuration (before groove formation) | first layer | Metal oxide layer (sol-gel + UV) | — | TiO$_2$ | TiO$_2$ |
|  |  | Film thickness | (nm) | 22 | 22 |
|  |  | Refractive index | — | 1.85 | 1.85 |
|  |  | Organic component content | (%) | 15 | 15 |
|  | second & sixth layers | Barrier layer | Post-oxidation | Titanium oxide | Titanium oxide |
|  |  | Film thickness | (nm) | 2 | 2 |
|  |  | Ti/O ratio | — | 1.0/1.8-1.0/1.6 | 1.0/1.8-1.0/1.6 |
|  |  | Metal layer | — | Ag—Cu | Ag—Cu |
|  |  | Film thickness | (nm) | 9 | 9 |
|  |  | Secondary element content | (% by atom) | Cu: 4 | Cu: 4 |
|  |  | Barrier layer | Post-oxidation | Titanium oxide | Titanium oxide |
|  |  | Film thickness | (nm) | 2 | 2 |
|  |  | Ti/O ratio | — | 1.0/1.8-1.0/1.6 | 1.0/1.8-1.0/1.6 |
|  | third & fifth layers | Metal oxide layer (sol-gel + UV) | — | TiO$_2$ | TiO$_2$ |
|  |  | Film thickness | (nm) | 68 | 68 |
|  |  | Refractive index | — | 1.85 | 1.85 |
|  |  | Organic component content | (%) | 15 | 15 |
|  | fourth layer | Barrier layer | Post-oxidation | Titanium oxide | Titanium oxide |
|  |  | Film thickness | (nm) | 2 | 2 |
|  |  | Ti/O ratio | — | 1.0/1.8-1.0/1.6 | 1.0/1.8-1.0/1.6 |
|  |  | Metal layer | — | Ag—Cu | Ag—Cu |
|  |  | Film thickness | (nm) | 11 | 11 |
|  |  | Secondary element content | (% by atom) | Cu: 4 | Cu: 4 |
|  |  | Barrier layer | Post-oxidation | Titanium oxide | Titanium oxide |
|  |  | Film thickness | (nm) | 2 | 2 |
|  |  | Ti/O ratio | — | 1.0/1.8-1.0/1.6 | 1.0/1.8-1.0/1.6 |
|  | seventh layer | Metal oxide thin film (sol-gel + UV) | — | TiO$_2$ | TiO$_2$ |
|  |  | Film thickness | (nm) | 34 | 34 |
|  |  | Refractive index | — | 1.85 | 1.85 |
|  |  | Organic component content | (%) | 15 | 15 |

(*) Order of a laminating layer is counted from the film side.
(*) A barrier layer, as a thin film layer attached to a metal layer, is included in the metal layer for laminating layer number counting.
(*) Film thickness is physical film thickness.

2.2 Preparation of Transparent Laminate Film (with Grooves)

(1) Transparent Laminate Film having Grooves formed by Cracks (Ozone Ashing) The above prepared transparent laminate film having the three-layer laminate structure (without grooves) and transparent laminate film having the seven-layer laminate structure (without grooves) were prepared.

Next, surfaces of the laminate structures of the transparent laminate films (without grooves) were ozone ashed in a mixture of oxygen ($O_2$) and ozone ($O_3$) using a surface treatment apparatus (an "ozone ashing equipment" manufactured by Surf Clean Co.).

In this case, a supplying oxygen ($O_2$) flow rate was 3 L/minute, and ozone ($O_3$) concentration was 50 ppm. A stage speed of the surface treatment apparatus was 0.3 m/minute. Heating was performed for promoting sol-gel reaction of a remaining component of a starting material of the sol-gel method, contained in the $TiO_2$ layers (in particular, the outermost layer). Heating was performed using an infrared heater equipped in the surface treatment apparatus (heater set temperature: 160□).

The above ozone ashing processing was performed five times with respect to the transparent laminate film having the three-layer laminate structure (without grooves), which was used as a transparent laminate film according to an embodiment 1. The above ozone ashing processing was performed five times with respect to the transparent laminate film having the seven-layer laminate structure (without grooves), which was then used as a transparent laminate film according to an embodiment 2.

On the other hand, the transparent laminate film having the three-layer laminate structure (without grooves) was used as a transparent laminate film according to a comparative example 1. The transparent laminate film having the seven-layer laminate structure (without grooves) was used as a transparent laminate film according to a comparative example 2. The above ozone ashing processing was performed three times with respect to the transparent laminate film having the three-layer laminate structure (without grooves), which was then used as a transparent laminate film according to a comparative example 3. The above ozone ashing processing was performed three times with respect to the transparent laminate film having the seven-layer laminate structure (without grooves), which was then used as a transparent laminate film according to a comparative example 4.

(2) Transparent Laminate Film Having Grooves Formed by Laser Processing

The above prepared transparent laminate film having the three-layer laminate structure (without grooves) and transparent laminate film having the seven-layer laminate structure (without grooves) were prepared.

Figure 2A:
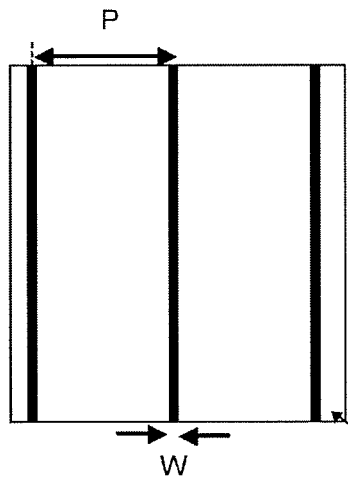
FIG. 2(a) is a diagram of a transparent laminate film viewed from a surface side of a laminate structure, illustrating slit-like grooves.
Figure 2B:
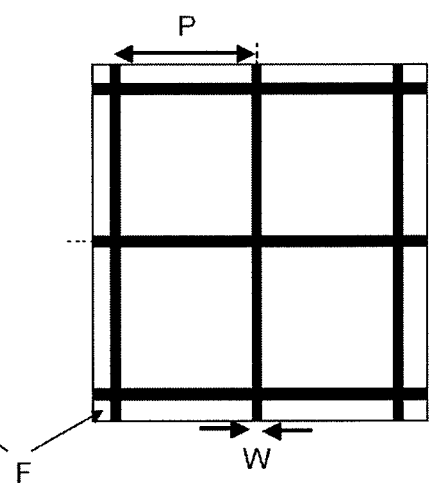
FIG. 2(b) is a diagram of a transparent laminate film viewed from a surface side of a laminate structure, illustrating lattice-like grooves.

Next, surfaces of the laminate structures of the transparent laminate film (without grooves) were laser processed using a laser processing apparatus (LD pumped Nd:YVO4 laser of a wavelength $\lambda=532$ nm, manufactured by Takei Electric Industries Co., Ltd.). FIG. 2 illustrates shapes formed by the laser processing. FIG. 2 shows diagrams of the transparent laminate films F viewed from the laminate structure surface side: (a) illustrates slit-like grooves having a groove width W=10 μm and a groove pitch P=2 mm; and (b) illustrates lattice-like grooves having a groove width W=10 μm and a groove pitch P=2 mm. Laser processing conditions, for processing any of the shapes, were as follows: power: 0.1 W; frequency: 40 kHz; and processing speed: 200 mm/second.

The transparent laminate film having the three-layer laminate structure (without grooves) was used to have lattice-like grooves formed in the laminate structure so as to obtain a surface resistance of 150Ω/□ or more, and was then used as a transparent laminate film according to an embodiment 3. The transparent laminate film having the seven-layer laminate structure (without grooves) was used to have lattice-like grooves formed in the laminate structure so as to obtain a surface resistance of 150Ω/□ or more, and was then used as a transparent laminate film according to an embodiment 4.

On the other hand, the transparent laminate film having the three-layer laminate structure (without grooves) was used to have slit-like grooves formed in the laminate structure so as to obtain a surface resistance of less than 150Ω/□, and was then used as a transparent laminate film according to a comparative example 5. The transparent laminate film having the seven-layer laminate structure (without grooves) was used to have slit-like grooves formed in the laminate structure so as to obtain a surface resistance of less than 150Ω/□, and was then used as a transparent laminate film according to a comparative example 6.

(3) Transparent Laminate Film Having Grooves (Stretching) Formed by Cracks

The above prepared transparent laminate film having the three-layer laminate structure (without grooves) and transparent laminate film having the seven-layer laminate structure (without grooves) were prepared. Sizes of the prepared transparent laminate films are: length: 200 mm, and width: 200 mm.

Next, uniaxial stretching was performed with respect to each sample using a uniaxial stretching apparatus ("STA-1225" manufactured by ORIENTEC Co., Ltd.) to introduce cracks as grooves. Biaxial stretching was performed with respect to each sample using a biaxial stretching apparatus ("2AT-500" manufactured by Shimadzu Corporation) to introduce cracks as grooves.

In this case, conditions of the uniaxial stretching were: tensile direction: longitudinal direction, and tensile ratio: 15%. Conditions of the biaxial stretching were: tensile direction: longitudinal direction and width-wise direction, and tensile ratio: 3%.

The above uniaxial stretching was performed with respect to the transparent laminate film having the three-layer laminate structure (without grooves), which was then used as a transparent laminate film according to an embodiment 5. The above biaxial stretching was performed with respect to the transparent laminate film having the three-layer laminate structure (without grooves), which was then used as a transparent laminate film according to an embodiment 6. The above uniaxial stretching was performed with respect to the transparent laminate film having the seven-layer laminate structure (without grooves), which was then used as a transparent laminate film according to an embodiment 7. The above biaxial stretching was performed with respect to the transparent laminate film having the seven-layer laminate structure (without grooves), which was then used as a transparent laminate film according to an embodiment 8.

3. Experiment 2

3.1 Preparation of Transparent Laminate Film (with Grooves)

A polyethylene terephthalate film of a thickness of 38 μm having an easy adhesion layer formed on both sides thereof ("COSMOSHINE (registered trademark) A4300" manufactured by Toyobo Co., Ltd.) (PET film) was prepared as the transparent polymer film, and a thin film having a three-layer laminate structure or a seven-layer laminate structure was formed on one easy adhesion layer side of this PET film. Except this point, a transparent laminate film having a three-layer laminate structure (with grooves) (embodiment 9) and a transparent laminate film having a seven-layer laminate structure (with grooves) (embodiment 10) were prepared in the same way as for the preparation of the transparent laminate film (without grooves) in the experiment 1, as outlined in the following.

That is, the transparent laminate film having a three-layer laminate structure (with grooves) (embodiment 9) has a laminate structure in which the following layers are laminated in sequence on top of the easy adhesion layer of the PET film: a $TiO_2$ layer formed by a sol-gel method and ultraviolet irradiation (first layer)|a layer formed by post-oxidizing a metal Ti layer/an Ag—Cu alloy layer/a metal Ti layer (second layer) |a $TiO_2$ layer formed by a sol-gel method and ultraviolet irradiation (third layer).

On the other hand, the transparent laminate film having a seven-layer laminate structure (with grooves) (embodiment 10) has laminate structure in which the following layers are laminated in sequence on top of the easy adhesion layer of the PET film: a $TiO_2$ layer formed by a sol-gel method and ultraviolet irradiation (first layer)|a layer formed by post-oxidizing a metal Ti layer/an Ag—Cu alloy layer/a metal Ti layer (second layer)|a $TiO_2$ layer formed by a sol-gel method and ultraviolet irradiation (third layer)|a layer formed by post-oxidizing a metal Ti layer/an Ag—Cu alloy layer/a metal Ti layer (fourth layer)|a $TiO_2$ layer formed by a sol-gel method and ultraviolet irradiation (fifth layer)|a layer formed by post-oxidizing a metal Ti layer/an Ag—Cu alloy layer/a metal Ti layer (sixth layer)|a $TiO_2$ layer formed by a sol-gel method and ultraviolet irradiation (seventh layer).

In the above, the post-oxidized metal Ti layers correspond to barrier layers. The barrier layers, as thin films attached to the alloy layers, are included in the alloy layers for laminating layer number counting. The post-oxidation, specifically, is thermal oxidation.

Here, the preparation of the transparent laminate film (with grooves) is significantly different as compared with the preparation of the transparent laminate film (without grooves) in the experiment 1 in that the laminate structure is formed on top of the adhesion layer of the PET film. When the laminate structure is formed on top of the easy adhesion layer, cracks are formed in the metal layers constituting the laminate structure during the formation of the laminate structure. Therefore, by using these cracks as grooves, without going through the groove formation process performed in the experiment 1, the continuity of the metal layers constituting the laminate structure can be broken, and surface resistance can be increased.

3.2 Preparation of Transparent Laminate Film (without Grooves)

A polyethylene terephthalate film of a thickness of 38 μm having an easy adhesion layer formed on one side thereof ("COSMOSHINE (registered trademark) A4100" manufactured by Toyobo Co., Ltd.) (PET film) was prepared as the transparent polymer film, and a thin film having a three-layer laminate structure or a seven-layer laminate structure was formed on a surface (PET surface) on a side opposite to the easy adhesion layer side of this PET film. Except this point, a transparent laminate film having a three-layer laminate structure (without grooves) (comparative example 7) and a transparent laminate film having a seven-layer laminate structure (without grooves) (comparative example 8) were prepared in the same way as for the preparation of the transparent laminate film (without grooves) in the experiment 1, as outlined in the following.

That is, the transparent laminate film having a three-layer laminate structure (without grooves) (comparative example 7) has a laminate structure in which the following layers are laminated in sequence on a surface (PET surface) on a side opposite to the easy adhesion layer side of the PET film: a $TiO_2$ layer formed by a sol-gel method and ultraviolet irradiation (first layer)|a layer formed by post-oxidizing a metal Ti layer/an Ag—Cu alloy layer/a metal Ti layer (second layer) |a $TiO_2$ layer formed by a sol-gel method and ultraviolet irradiation (third layer).

On the other hand, the transparent laminate film having a seven-layer laminate structure (without grooves) (comparative example 8) has laminate structure in which the following layers are laminated in sequence on a surface (PET surface) on the side opposite to the easy adhesion layer side of the PET film: a $TiO_2$ layer formed by a sol-gel method and ultraviolet irradiation (first layer)|a layer formed by post-oxidizing a metal Ti layer/an Ag—Cu alloy layer/a metal Ti layer (second layer)|a $TiO_2$ layer formed by a sol-gel method and ultraviolet irradiation (third layer)|a layer formed by post-oxidizing a metal Ti layer/an Ag—Cu alloy layer/a metal Ti layer (fourth layer)|a $TiO_2$ layer formed by a sol-gel method and ultraviolet irradiation (fifth layer)|a layer formed by post-oxidizing a metal Ti layer/an Ag—Cu alloy layer/a metal Ti layer (sixth layer)|a $TiO_2$ layer formed by a sol-gel method and ultraviolet irradiation (seventh layer).

In the above, post-oxidized metal Ti layers correspond to barrier layers. The barrier layers, as thin films attached to the alloy layers, are included in the alloy layers for laminating layer number counting. The post-oxidation, specifically, is thermal oxidation.

Table 3 illustrates detailed lamination configurations of transparent laminate films having the three-layer laminate structures (with grooves and without grooves), and Table 4 illustrates detailed lamination configurations of transparent laminate film having the seven-layer laminate structures (with grooves and without grooves).

TABLE 3

|  |  |  |  | Embodiment 9 | Comparative Example 7 |
|---|---|---|---|---|---|
| Film |  | Transparent polymer film | — | PET | PET |
|  |  | Film thickness | (μm) | 38 | 38 |
|  |  | Thin film layer formation side |  | Easy adhesion layer | Opposite side (PET side) of easy adhesion layer |
| Thin film layer configuration (grooves are formed during lamination for embodiment) | first layer | Metal oxide layer (sol-gel + UV) | — | $TiO_2$ | $TiO_2$ |
|  |  | Film thickness | (nm) | 22 | 22 |
|  |  | Refractive index | — | 1.85 | 1.85 |
|  |  | Organic Component content | (%) | 15 | 15 |

TABLE 3-continued

|  |  |  |  | Embodiment 9 | Comparative Example 7 |
|---|---|---|---|---|---|
|  | second layer | Barrier layer Film thickness Ti/O ratio | Post-oxidation (nm) — | Titanium oxide 2 — | Titanium oxide 2 1.0/1.8-1.0/1.6 |
|  |  | Metal layer Film thickness Secondary element content | — (nm) (% by atom) | Ag—Cu 9 Cu: 4 | Ag—Cu 9 Cu: 4 |
|  |  | Barrier layer Film thickness Ti/O ratio | Post-oxidation (nm) — | Titanium oxide 2 1.0/1.8-1.0/1.6 | Titanium oxide 2 1.0/1.8-1.0/1.6 |
|  | third layer | Metal oxide layer (sol-gel + UV) Film thickness Refractive index Organic component content | — (nm) — (%) | TiO$_2$ 34 1.85 15 | TiO$_2$ 34 1.85 15 |
| Grooves existence |  |  |  | Yes (Cracks) | No |

(*) Order of a laminating layer is counted from the film side.
(*) A barrier layer, as a thin film layer attached to a metal layer, is included in the metal layer for laminating layer number counting.
(*) Film thickness is physical film thickness.

TABLE 4

|  |  |  |  | Embodiment 10 | Comparative Example 8 |
|---|---|---|---|---|---|
| Film |  | Transparent polymer film Film thickness Thin film layer formation side | — (μm) — | PET 38 Easy adhesion layer | PET 38 Opposite side (PET side) of easy adhesion layer |
| Thin film layer configuration (grooves are formed during lamination for embodiment) | first layer | Metal oxide layer (sol-gel + UV) Film thickness Refractive index Organic component content | — (nm) — (%) | TiO$_2$ 22 1.85 15 | TiO$_2$ 22 1.85 15 |
|  | second, sixth, layers | Barrier layer Film thickness Ti/O ratio Metal layer Film thickness Secondary element content | Post-oxidation (nm) — — (nm) (% by atom) | Titanium oxide 2 1.0/1.8-1.0/1.6 Ag—Cu 9 Cu: 4 | Titanium oxide 2 1.0/1.8-1.0/1.6 Ag—Cu 9 Cu: 4 |
|  |  | Barrier layer Film thickness Ti/O ratio | Post-oxidation (nm) — | Titanium oxide 2 1.0/1.8-1.0/1.6 | Titanium oxide 2 1.0/1.8-1.0/1.6 |
|  | third, fifth layers | Metal oxide layer (sol-gel + UV) Film thickness Refractive index Organic component content | — (nm) — (%) | TiO$_2$ 68 1.85 15 | TiO$_2$ 68 1.85 15 |
|  | fourth layer | Barrier layer Film thickness Ti/O ratio Metal layer Film thickness Secondary element content | Post-oxidation (nm) — — (nm) (% by atom) | Titanium oxide 2 1.0/1.8-1.0/1.6 Ag—Cu 11 Cu: 4 | Titanium oxide 2 1.0/1.8-1.0/1.6 Ag—Cu 11 Cu: 4 |
|  |  | Barrier layer Film thickness Ti/O ratio | Post-oxidation (nm) — | Titanium oxide 2 1.0/1.8-1.0/1.6 | Titanium oxide 2 1.0/1.8-1.0/1.6 |
|  | seventh layer | Metal oxide layer (sol-gel + UV) Film thickness Refractive index Organic component content | — (nm) — (%) | TiO$_2$ 34 1.85 15 | TiO$_2$ 34 1.85 15 |
| Grooves existence |  |  |  | Yes (Cracks) | No |

(*) Order of a laminating layer is counted from the film side.
(*) A barrier layer, as a thin film layer attached to a metal layer, is included in the metal layer for laminating layer number counting.
(*) Film thickness is physical film thickness.

4. Evaluation of Transparent Laminate Films
4.1 Optical Characteristics
With respect to each of the prepared transparent laminated films, the following optical characteristics were measured. A measurement sample used for a measurement was prepared by pasting an acryl adhesive sheet having a thickness of 25 μm ("CS9621" manufactured by Nitto Denko Corporation) on a thin film laminating layer surface of the transparent laminate film, and pasting an adhesive layer of the adhesive sheet on one side of a float glass having a thickness of 3 mm. Measurement light was made incident from a glass surface side during evaluation of optical characteristics.

(Visible Light Transmittance and Visible Light Reflectance)

Transmission spectrum in a wavelength range of 300-1000 nm was measured using a spectral photometer ("UV 3100" manufactured by Shimadzu Corporation) in accordance with JIS A5759, and visible light transmittance and visible light reflectance were obtained by calculation.

(Solar Radiation Transmittance)

Transmission spectrum in a wavelength range of 300-2500 nm was measured using a spectral photometer ("UV 3100" manufactured by Shimadzu Corporation) in accordance with JIS A5759, and solar radiation transmittance was obtained by calculation.

4.2 Radio Wave Transparency

Transmission attenuation at a frequency of 1 GHz was measured using an electromagnetic wave shielding and electromagnetic shielding properties testing equipment ("MA8602B" manufactured by Anritsu Corporation) and a spectrum analyzer ("MS2661C" manufactured by Anritsu Corporation), according to a method of the Kansai Electronic Industry Development Center (KEC).

4.3 Appearance

The thin film layer formation side of the transparent laminate film was applied to a window glass using a method of wet application. Whether the grooves are visible was visually confirmed from a distance of 30 cm. A case where the grooves are not visible was considered as having a good appearance; and a case where the grooves are visible was considered as having a poor appearance.

Results of the measurements with respect to each of the transparent laminate films are summarized in Tables 5-8.

TABLE 5

| | | three-layer laminate structure | | | seven-layer laminate structure | | |
|---|---|---|---|---|---|---|---|
| | | Embodiment 1 | Comparative example 1 | Comparative example 3 | Embodiment 2 | Comparative example 2 | Comparative example 4 |
| Grooves | | | | | | | |
| Formation method | — | Ozone ashing 5 times | — | Ozone ashing 3 times | Ozone ashing 5 times | — | Ozone ashing 3 times |
| Shape | — | Cracks | — | Cracks | Cracks | — | Cracks |
| Surface resistance | (Ω/□) | 480 | 16 | 47 | 476 | 4 | 12 |
| Optical characteristics | | | | | | | |
| Visible light transmittance | (%) | 88 | 88 | 87 | 70 | 72 | 70 |
| Visible light reflectance | (%) | 7 | 6 | 6 | 8 | 8 | 8 |
| Solar radiation transmittance | (%) | 63 | 62 | 62 | 43 | 41 | 42 |
| Radio wave transparency | | | | | | | |
| Transmission attenuation (frequency 1.0 GHz) | (dB) | 1 | 24 | 15 | 1 | 34 | 18 |
| Appearance | | Good | Good | Good | Good | Good | Good |

TABLE 6

| | | three-layer laminate structure | | | seven-layer laminate structure | | |
|---|---|---|---|---|---|---|---|
| | | Embodiment 3 | Comparative example 1 | Comparative example 5 | Embodiment 4 | Comparative example 2 | Comparative example 6 |
| Grooves | | | | | | | |
| Formation method | — | Laser processing | — | Laser processing | Laser processing | — | Laser processing |
| Shape | Groove width | 10 μm | — | 10 μm | 10 μm | — | 10 μm |
| | Groove pitch | 2 mm | — | 2 mm | 2 mm | — | 2 mm |
| | — | Angular lattice like | — | Slit like | Angular lattice like | — | Slit like |
| Surface resistance | (Ω/□) | 400 | 16 | 85 | 385 | 4 | 80 |
| Optical characteristics | | | | | | | |
| Visible light transmittance | (%) | 87 | 88 | 88 | 72 | 72 | 71 |
| Visible light reflectance | (%) | 7 | 6 | 6 | 8 | 8 | 7 |
| Solar radiation transmittance | (%) | 62 | 62 | 63 | 41 | 41 | 40 |

TABLE 6-continued

|  |  | three-layer laminate structure | | | seven-layer laminate structure | | |
| --- | --- | --- | --- | --- | --- | --- | --- |
|  |  | Embodiment 3 | Comparative example 1 | Comparative example 5 | Embodiment 4 | Comparative example 2 | Comparative example 6 |
| Radio wave transparency |  |  |  |  |  |  |  |
| Transmission attenuation (frequency 1.0 GHz) | (dB) | 1 | 24 | 13 | 1 | 34 | 10 |
| Appearance |  | Good | Good | Good | Good | Good | Good |

TABLE 7

|  |  | three-layer laminate structure | | | seven-layer laminate structure | | |
| --- | --- | --- | --- | --- | --- | --- | --- |
|  |  | Embodiment 5 | Embodiment 6 | Comparative example 1 | Embodiment 7 | Embodiment 8 | Comparative example 2 |
| Grooves |  |  |  |  |  |  |  |
| Formation method | — | Uniaxially stretching 15% | Biaxially stretching 3% × 3% | — | Uniaxially stretching 15% | Biaxially stretching 3% × 3% | — |
| Shape | — | Cracks | Cracks | — | Cracks | Cracks | — |
| Surface resistance | ($\Omega/\square$) | 500 or more | 500 or more | 16 | 333 | 303 | 4 |
| Optical characteristics |  |  |  |  |  |  |  |
| Visible light transmittance | (%) | 79 | 79 | 79 | 70 | 70 | 70 |
| Visible light reflectance | (%) | 10 | 10 | 10 | 8 | 8 | 8 |
| Solar radiation transmittance | (%) | 60 | 61 | 59 | 44 | 45 | 43 |
| Radio wave transparency |  |  |  |  |  |  |  |
| Transmission attenuation (frequency 1.0 GHz) | (dB) | 1 | 1 | 24 | 1 | 3 | 30 |
| Appearance |  | Good | Good | Good | Good | Good | Good |

TABLE 8

|  |  | three-layer laminate structure | | seven-layer laminate structure | |
| --- | --- | --- | --- | --- | --- |
|  |  | Embodiment 9 | Comparative example 7 | Embodiment 10 | Comparative example 8 |
| Grooves |  |  |  |  |  |
| Shape | — | Cracks | — | Cracks | — |
| Surface resistance | ($\Omega/\square$) | 500 or more | 16 | 220 | 4 |
| Optical characteristics |  |  |  |  |  |
| Visible light transmittance | (%) | 79 | 79 | 70 | 70 |
| Visible light reflectance | (%) | 10 | 10 | 8 | 8 |
| Solar radiation transmittance | (%) | 59 | 59 | 43 | 43 |
| Radio wave transparency |  |  |  |  |  |
| Transmission attenuation (frequency 1.0 GHz) | (dB) | 1 | 24 | 3 | 30 |
| Appearance |  | Good | Good | Good | Good |

According to Table 5, the following is clear. That is, for the transparent laminate films according to the comparative examples 1 and 2, grooves due to cracks are not formed in the laminate structures. Therefore, the metal layers in the laminate structures are continuous, conductivity is high, and it is difficult to achieve an overall surface resistance of 150Ω/□ or more for the films. For this reason, the transmission attenuation becomes large, and radio wave transparency is poor.

Figure 3:
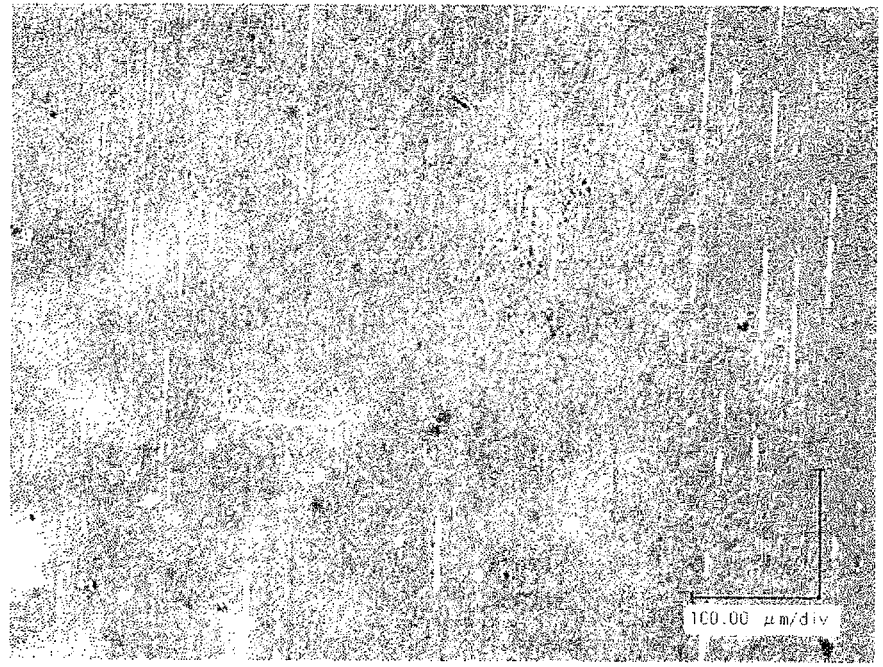
FIG. 3 is an optical micrograph of a transparent laminate film according to a comparative example 4, viewed from a surface side of a laminate structure.

For the transparent laminate films according to the comparative examples 3 and 4, by performing ozone ashing with respect to the surfaces of the laminate structures, remaining components of starting materials of the sol-gel method contained in the $TiO_2$ layers (in particular, the outermost layers) are further sol-gel reacted. However, insufficient energy was applied to the laminate structures. Therefore, as FIG. 3 illustrates, there are not enough number of cracks formed to achieve an overall surface resistance of 150Ω/□ or more for the films. For this reason, although the transmission attenuation is reduced as compared to the transparent laminate films according to the comparative examples 1 and 2, the transmission attenuation is still large, and the radio wave transparency is still poor.

Figure 4:
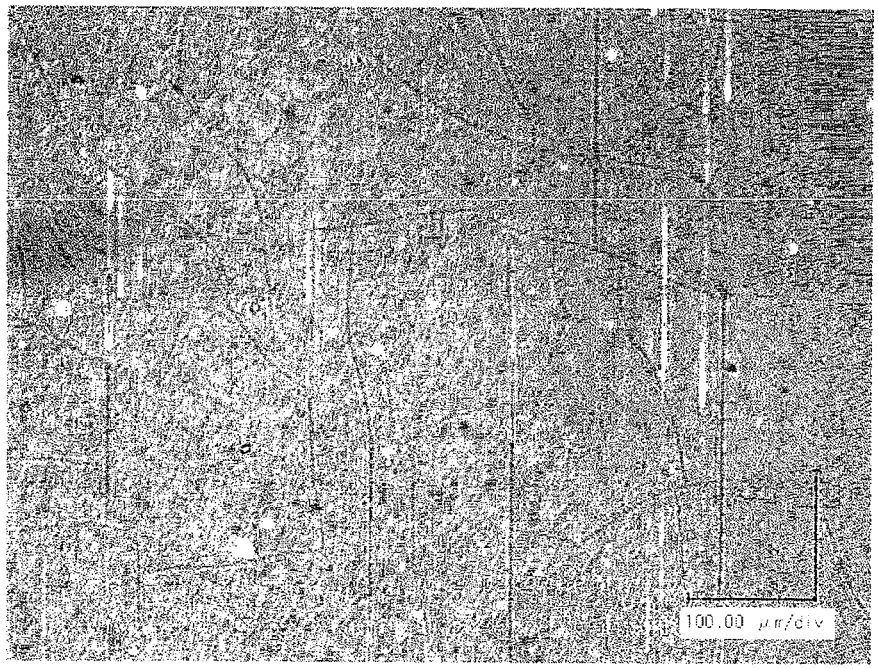
FIG. 4 is an optical micrograph of a transparent laminate film according to embodiment 2, viewed from a surface side of a laminate structure (for a case where grooves are cracks formed by ozone ashing)

In contrast, for the transparent laminate films according to the embodiments 1 and 2, as FIG. 4 illustrates, there are numerous cracks having a width of about 2-3 μm formed in the laminate structures. Due to the cracks introduced into the laminate structures, the overall surface resistances of the films are 150Ω/□ or more. That is, the metal layers in the laminate structures are broken due to the cracks so that the overall surface resistances of the films become 150Ω/□ or more. Therefore, the films have good radio wave transparency. In addition, because there are numerous cracks, directionality in the surface resistance is unlikely to appear so that the films also have superior uniformity in the surface resistance.

Further, because the width of the grooves is 30 μm or less, the grooves are hardly visible to human eyes when used and thus the films have a good appearance. In the above laminate structures, the metal oxide layers such as the $TiO_2$ layers and the metal layers such as the Ag—Cu alloy layers and the like are laminated. Therefore, good visible light transparency and solar radiation shielding capability can be achieved. Reduction in visible light transparency and solar radiation shielding capability due to the introduction of the cracks is hardly seen.

According to Table 6, the following is clear. That is, for the transparent laminate films according to the comparative examples 1 and 2, grooves due to laser processing are not formed in the laminate structures. Therefore, the metal layers in the laminate structures are continuous, conductivity is high, and it is difficult to achieve an overall surface resistance of 150Ω/□ or more for the films. For this reason, the transmission attenuation becomes large, and radio wave transparency is poor.

For the transparent laminate films according to the comparative examples 5 and 6, grooves are formed in the laminate structures by subjecting the surfaces of the laminate structures to laser processing. However, the number of grooves formed is not sufficient. Therefore, the overall surface resistances of the films are less than 150Ω/□. For this reason, although the transmission attenuation is reduced as compared to the transparent laminate films according to the comparative examples 1 and 2, the transmission attenuation is still large, and the radio wave transparency is still poor.

Figure 5:
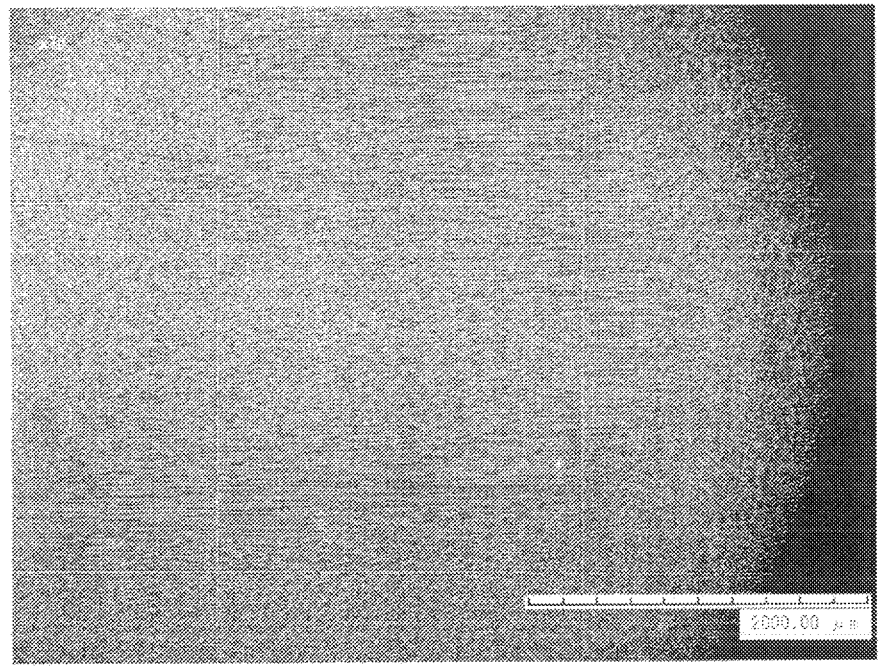
FIG. 5 is an optical micrograph of a transparent laminate film according to embodiment 4, viewed from a surface side of a laminate structure (for a case where grooves are formed by laser processing)
Figure 6:
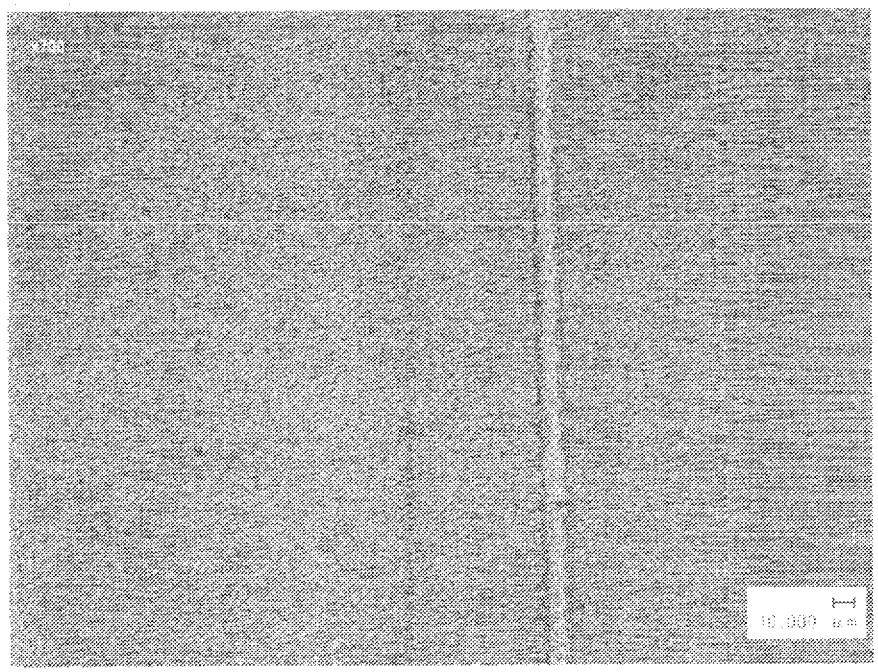
FIG. 6 is an enlarged photograph of FIG. 5.

In contrast, for the transparent laminate films according to the embodiments 3 and 4, as FIG. 5 and FIG. 6 illustrate, cracks having a width of about 10 μm are formed in the laminate structures by the laser processing. Due to the grooves introduced into the laminate structures, the overall surface resistances of the films are 150Ω/□ or more. That is, the metal layers in the laminate structures are broken due to the grooves so that the overall surface resistances of the films become 150Ω/□ or more. Therefore, the films have good radio wave transparency. In addition, because the grooves are formed in a lattice-like shape, as compared to the case where the grooves are formed in a slit-like shape, directionality in the surface resistance is unlikely to appear so that the films also have superior uniformity in the surface resistance.

Further, because the width of the grooves is 30 μm or less, the grooves are hardly visible to human eyes when used and thus the films have a good appearance. In the above laminate structures, the metal oxide layers such as the $TiO_2$ layers and the metal layers such as the Ag—Cu alloy layers and the like are laminated. Therefore, good visible light transparency and solar radiation shielding capability can be achieved. Reduction in visible light transparency and solar radiation shielding capability due to the introduction of the grooves formed by the laser processing is hardly seen.

According to Table 7, the following is clear. That is, for the transparent laminate films according to the comparative examples 1 and 2, grooves due to cracks are not formed in the laminate structures. Therefore, the metal layers in the laminate structures are continuous, conductivity is high, and it is difficult to achieve an overall surface resistance of 150Ω/□ or more for the films. For this reason, the transmission attenuation becomes large, and radio wave transparency is poor.

Figure 7:
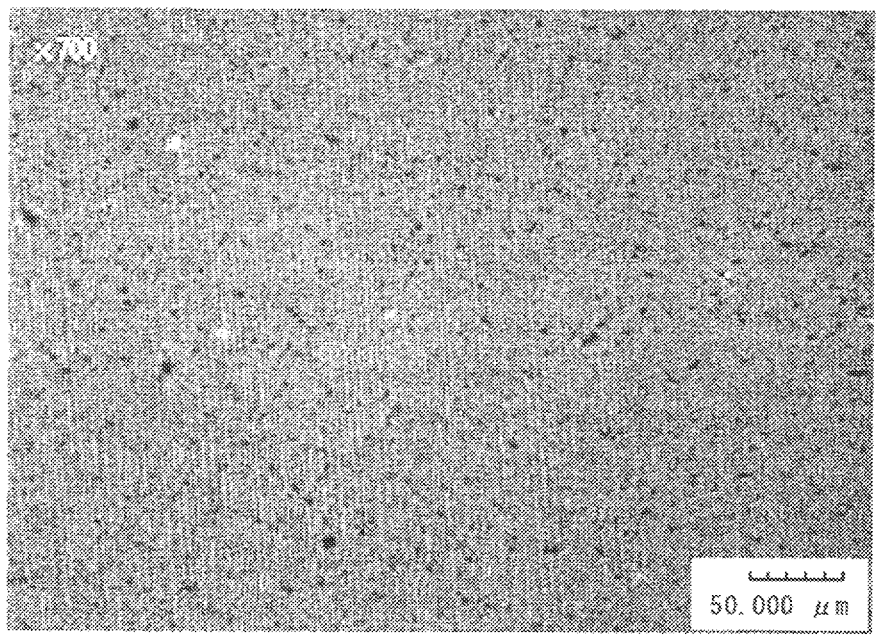
FIG. 7 is an optical micrograph of a transparent laminate film according to embodiment 7, viewed from a surface side of a laminate structure (for a case where grooves are cracks formed by a uniaxial stretching)
Figure 8:
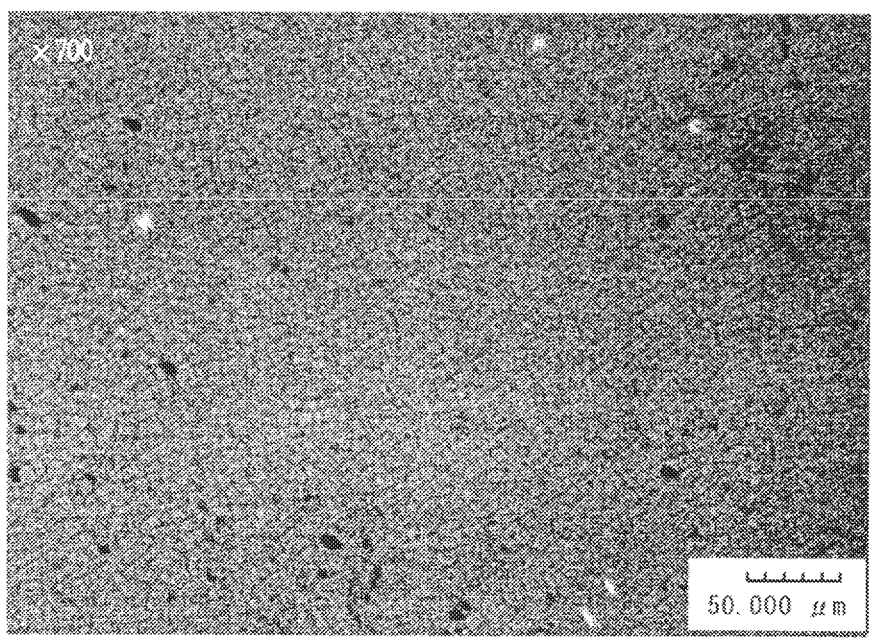
FIG. 8 is an optical micrograph of a transparent laminate film according to embodiment 8, viewed from a surface side of a laminate structure (for a case where grooves are cracks formed by a biaxial stretching)

In contrast, for the transparent laminate films according to the embodiments 5-8, as FIG. 7 and FIG. 8 illustrate, there are numerous cracks having a width of about 2-3 μm formed in the laminate structures. Due to the cracks introduced into the laminate structures, the overall surface resistances of the films are 150Ω/□ or more. That is, the metal layers in the laminate structures are broken due to the cracks so that the overall surface resistances of the films become 150Ω/□ or more. Therefore, the films have good radio wave transparency. In addition, because there are numerous cracks, directionality in the surface resistance is unlikely to appear so that the films also have superior uniformity in the surface resistance.

Further, because the width of the grooves is 30 μm or less, the grooves are hardly visible to human eyes when used and thus the films have a good appearance. In the above laminate structures, the metal oxide layers such as the $TiO_2$ layers and the metal layers such as the Ag—Cu alloy layers and the like are laminated. Therefore, good visible light transparency and solar radiation shielding capability can be achieved. Reduction in visible light transparency and solar radiation shielding capability due to the introduction of the cracks is hardly seen.

When making a comparison between the embodiments, the numerous cracks formed by uniaxial stretching are in a direction perpendicular to the tensile direction (FIG. 7). In contrast, the numerous cracks formed by biaxial stretching are irregular and directionless (FIG. 8). It is clear that, when the stretching is biaxial stretching, directionality in the surface resistance is unlikely to appear, and a transparent laminate film having superior uniformity in the surface resistance is likely to be obtained.

According to Table 8, the following is clear. That is, for the transparent laminate films according to the comparative examples 7 and 8, the laminate structure is formed on the surface (PET surface) on the side opposite to the easy adhesion layer side of the PET film. Therefore, cracks are not formed during the formation of the laminate structure, continuity of the metal layers is maintained, and the surface resistance is small. Thus, the transmission attenuation is large, and the radio wave transparency is poor.

Figure 9:
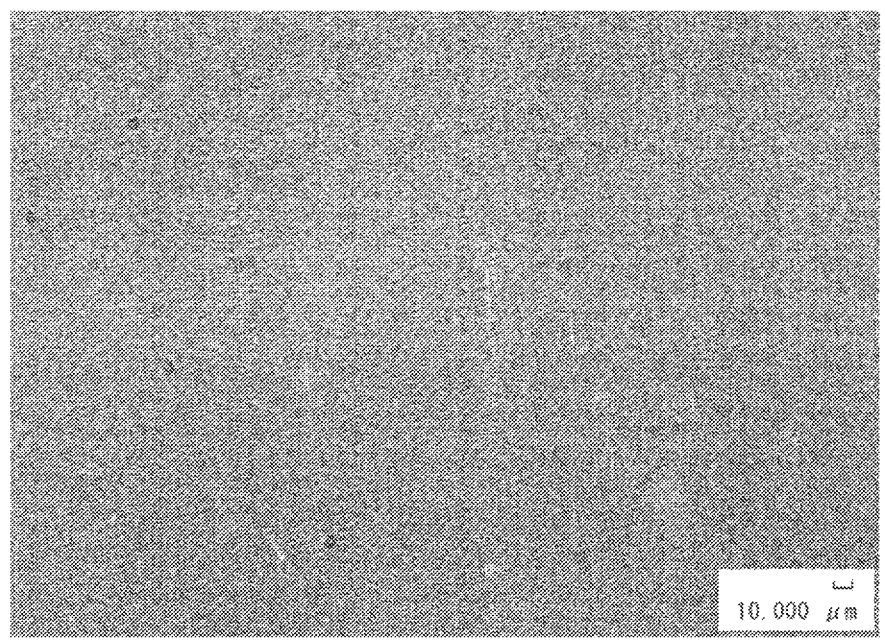
FIG. 9 is an optical micrograph of a transparent laminate film according to embodiment 10, viewed from a surface side of a laminate structure (for a case where grooves are cracks formed during formation of the laminate structure).

In contrast, for the transparent laminate films according to the embodiments 9 and 10, as FIG. 9 illustrates, despite the omission of the groove formation process, there are numerous cracks having a width of about 2-3 μm formed in the laminate structures. Due to the cracks introduced into the laminate structures, the overall surface resistances of the films are 150Ω/□ or more. That is, the metal layers in the laminate structures are broken by the cracks formed during the formation of the laminate structures so that the overall surface resistances of the films become 150Ω/□ or more. Therefore, the films have good radio wave transparency. In addition, because there are numerous cracks, directionality in the surface resistance is unlikely to appear so that the films also have superior uniformity in the surface resistance.

Further, because the width of the grooves is 30 μm or less, the grooves are hardly visible to human eyes when used and thus the films have a good appearance. In the above laminate structures, the metal oxide layers such as the $TiO_2$ layers and the metal layers such as the Ag—Cu alloy layers and the like are laminated. Therefore, good visible light transparency and solar radiation shielding capability can be achieved. Reduction in visible light transparency and solar radiation shielding capability due to the introduction of the cracks is hardly seen.

From the above results, it is confirmed that the transparent laminate film according to the present invention has a combination of visible light transparency, soar radiation shielding capability, radio wave transparency, and a good appearance.

In the above, the embodiments and examples of the present invention were explained. However, the present invention is not intended to be limited to the embodiments and examples. Various modifications are possible within the scope without departing from the spirit of the present invention.

What is claimed is:

1. A transparent laminate film comprising a laminate structure formed on at least one side of a transparent polymer film, in which a metal oxide layer and a metal layer are laminated, the metal oxide layer containing an organic component, wherein grooves having a width of 30 μm or less are formed in the laminate structure, and an overall surface resistance is 150 Ω/□ or more, wherein the transparent polymer film has an easy adhesion layer formed on at least one side thereof, and the laminate structure is formed on top of the easy adhesion layer.

2. The transparent laminate film according to claim 1, wherein the grooves are numerous cracks.

3. The transparent laminate film according to claim 1, wherein the grooves are formed by laser processing.

4. The transparent laminate film according to claim 1, wherein the metal oxide layer containing the organic component is formed by a sol-gel method using optical energy during sol-gel curing.

5. The transparent laminate film according to claim 1, wherein the metal oxide layer is a titanium oxide layer.

6. The transparent laminate film according to claim 1, wherein the metal layer is one of a silver layer and a silver alloy layer.

7. The transparent laminate film according to claim 1, wherein visible light transmittance is 60% or more.

8. The transparent laminate film according to claim 1 being used for transmission of radio wave of a frequency of 100 MHz or more.

9. A method for producing a transparent laminate film, comprising:

preparing a transparent polymer film having an easy adhesion layer formed on at least one side thereof;

forming a laminate structure by laminating a metal oxide layer and a metal layer on top of the easy adhesion layer on the at least one side, the metal oxide layer containing an organic component; and forming numerous cracks having a width of 30 μm or less in the laminate structure so that an overall surface resistance is 150 Ω/□ or more.

* * * * *